July 25, 1961  J. T. NEISWINTER  2,993,955
CODED PULSE TRAIN COMMUNICATION SYSTEMS
Filed March 19, 1959  9 Sheets-Sheet 1

JAMES T. NEISWINTER
INVENTOR.

BY

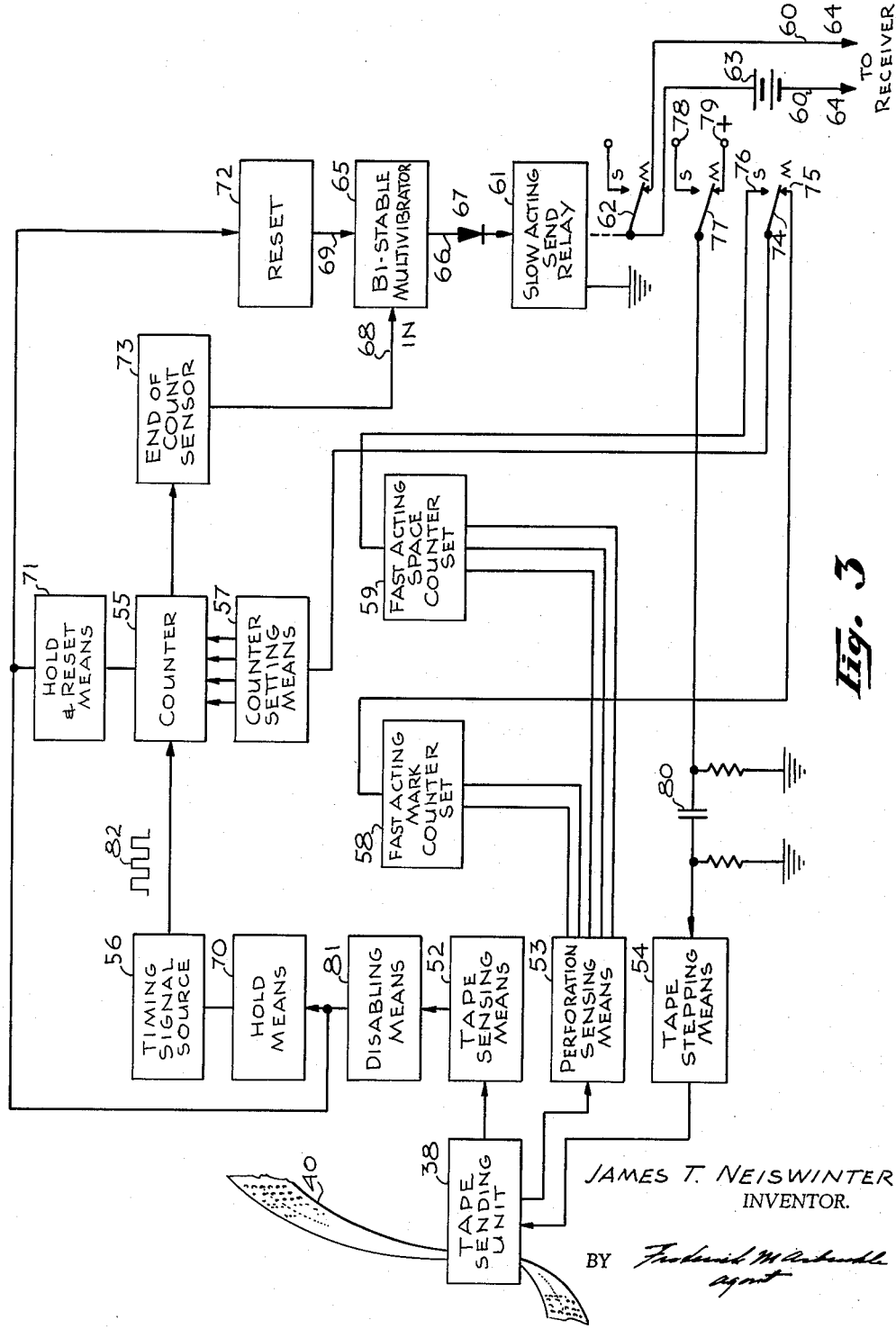

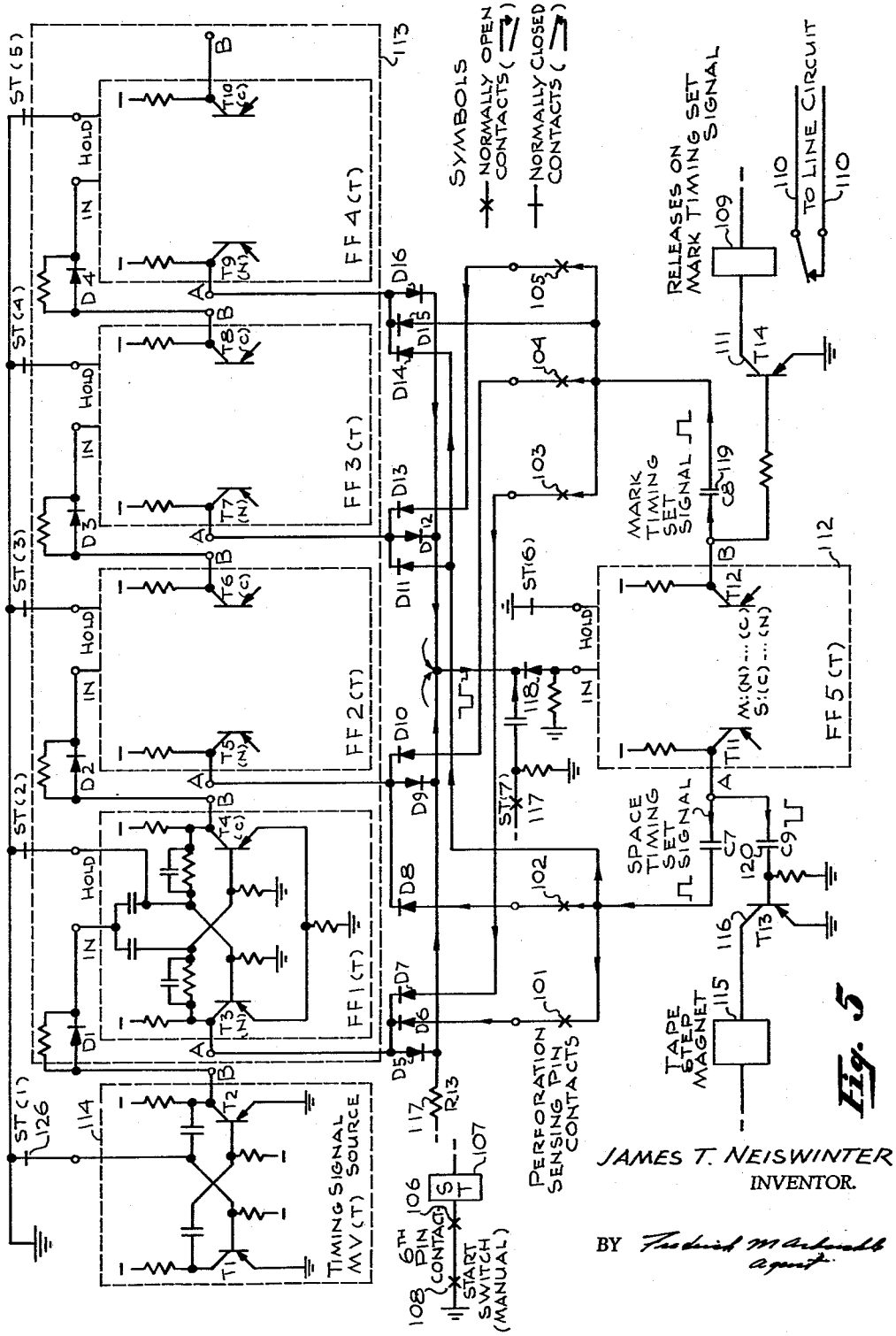

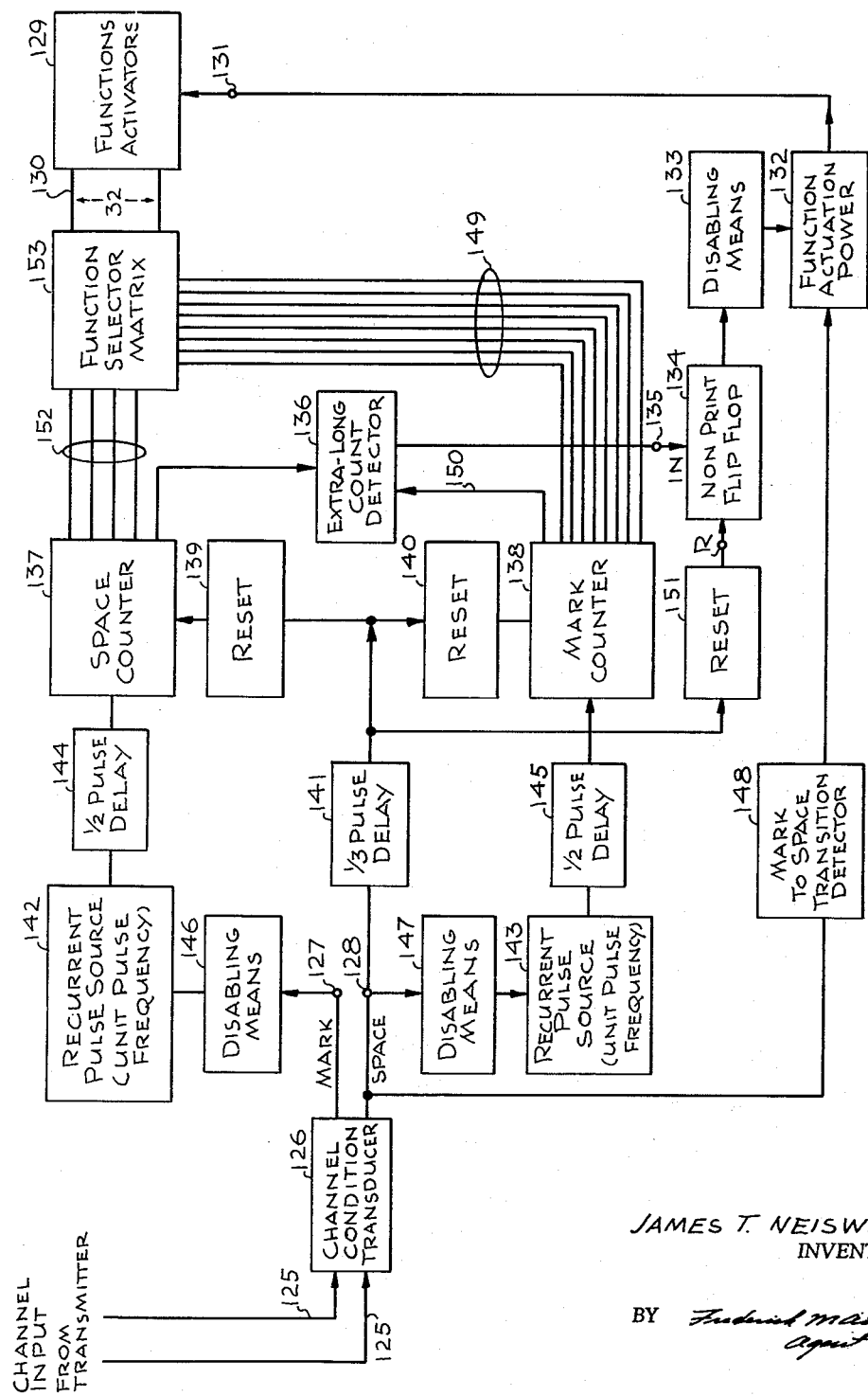

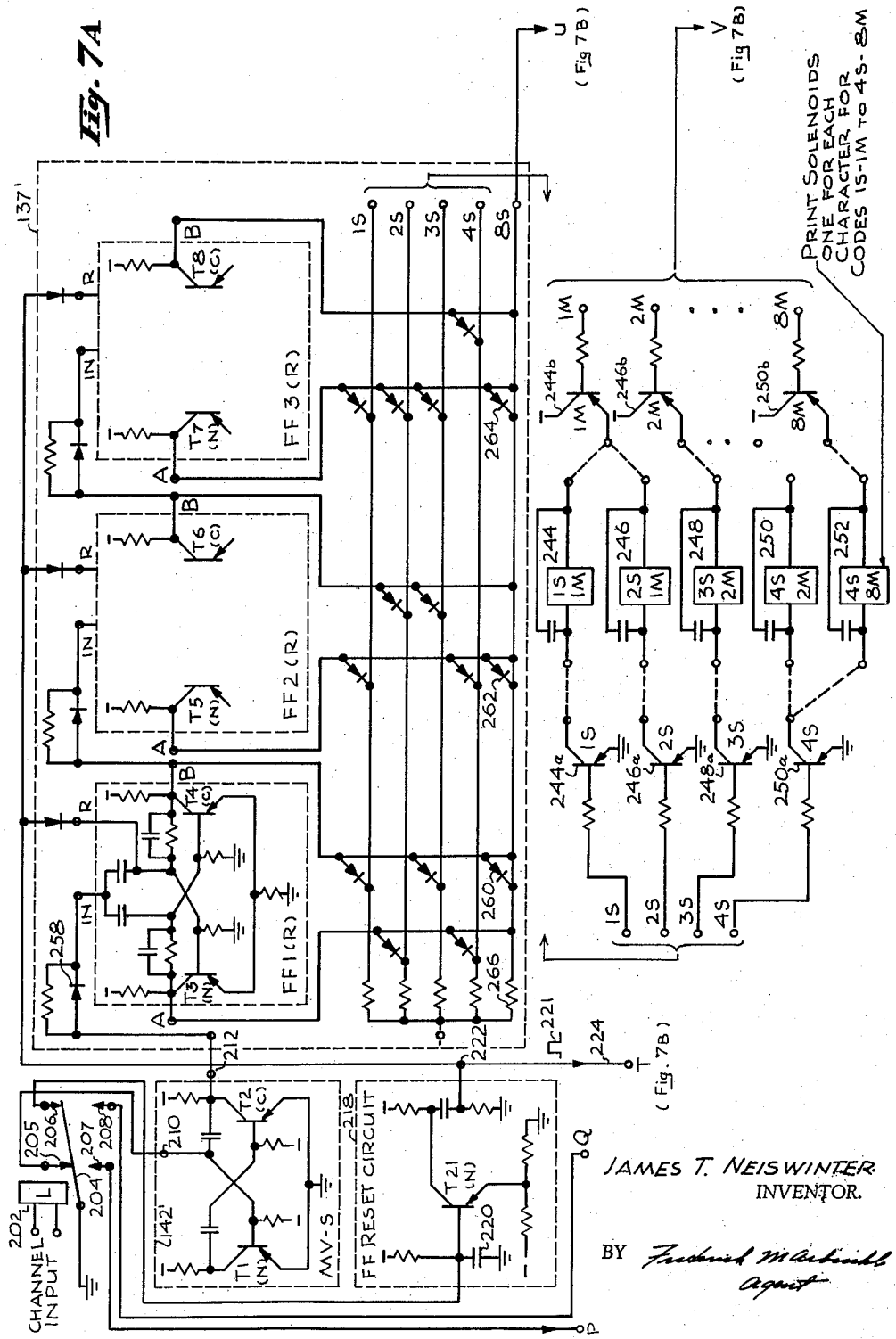

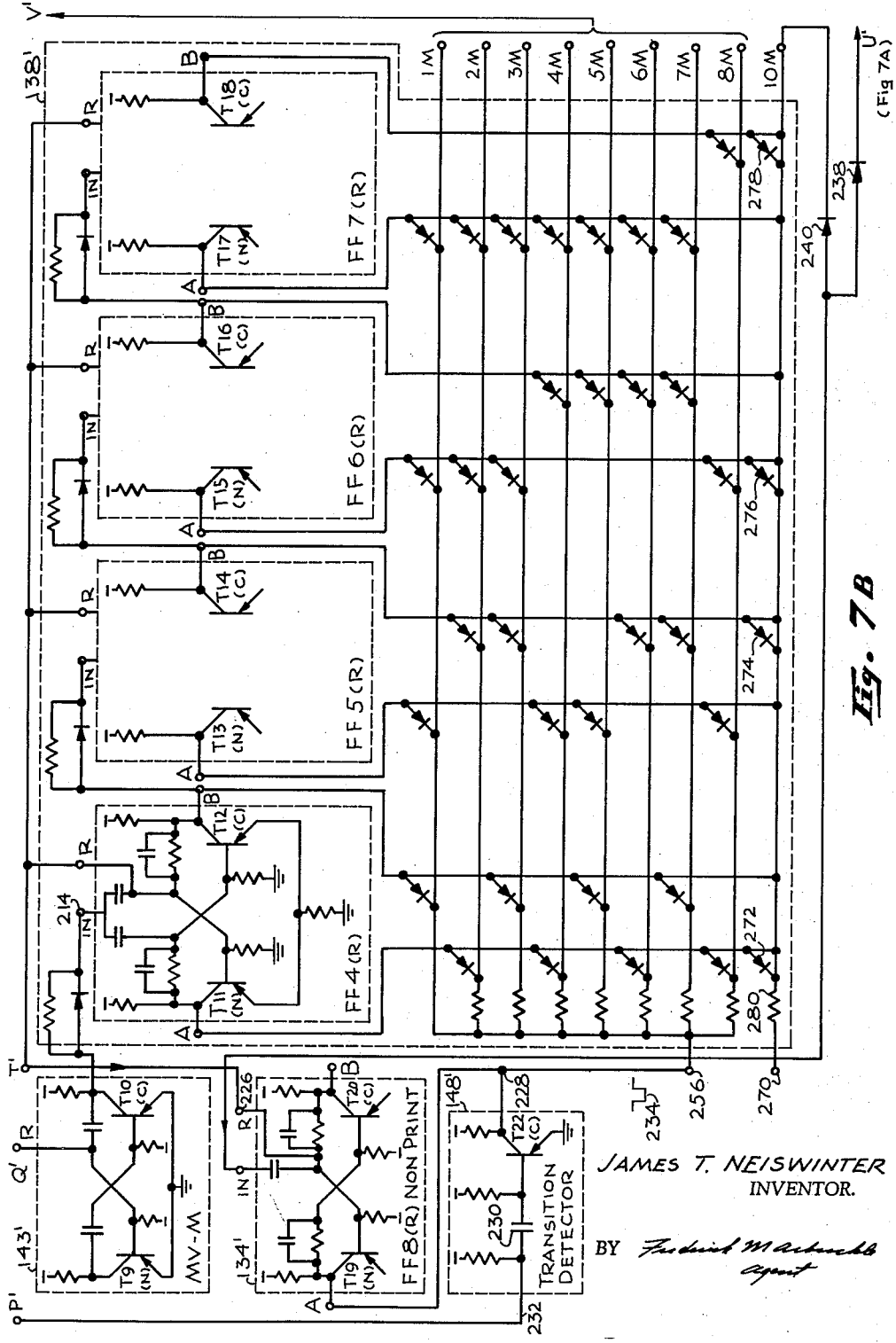

July 25, 1961  J. T. NEISWINTER  2,993,955
CODED PULSE TRAIN COMMUNICATION SYSTEMS
Filed March 19, 1959  9 Sheets-Sheet 7

COUNTER CONDUCTION SCHEDULE

| COUNT | FF1(4) T3(T11) | T4(T12) | FF2(5) T5(T13) | T6(T14) | FF3(6) T6(T15) | T7(T16) | FF7 T17 | T18 |
|---|---|---|---|---|---|---|---|---|
| 0 | N | C | N | C | N | C | N | C |
| 1 | C | N | N | C | N | C | N | C |
| 2 | N | C | C | N | N | C | N | C |
| 3 | C | N | C | N | N | C | N | C |
| 4 | N | C | N | C | C | N | N | C |
| 5 | C | N | N | C | C | N | N | C |
| 6 | N | C | C | N | C | N | N | C |
| 7 | C | N | C | N | C | N | N | C |
| 8 | N | C | N | C | N | C | C | N |
| 9 | C | N | N | C | N | C | C | N |
| 10 | N | C | C | N | N | C | C | N |
| 11 | C | N | C | N | N | C | C | N |
| 12 | N | C | N | C | C | N | C | N |
| 13 | C | N | N | C | C | N | C | N |
| 14 | N | C | C | N | C | N | C | N |
| 15 | C | N | C | N | C | N | C | N |
| 16 | N | C | N | C | N | C | N | C |

*Fig. 8*

JAMES T. NEISWINTER
INVENTOR.

BY

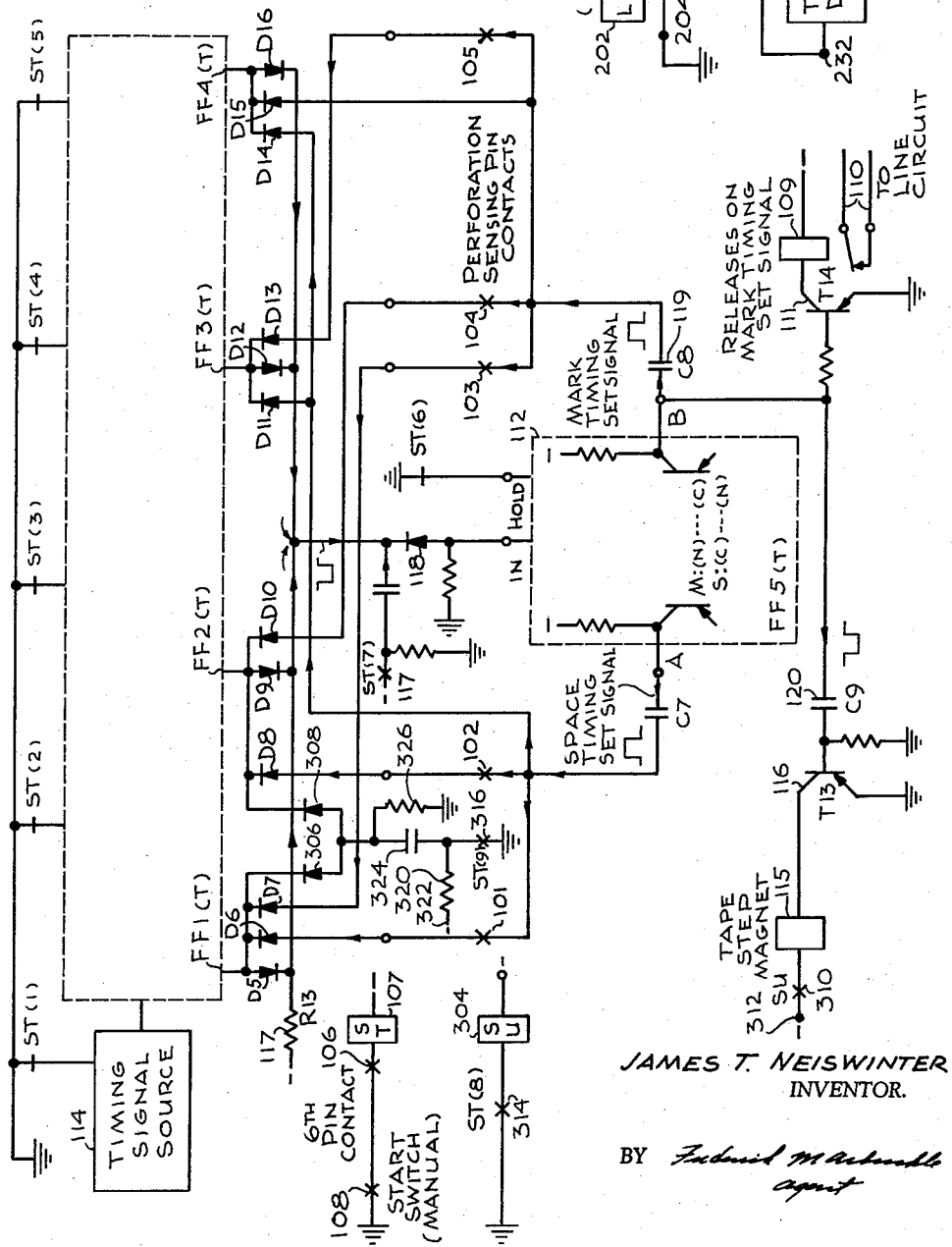

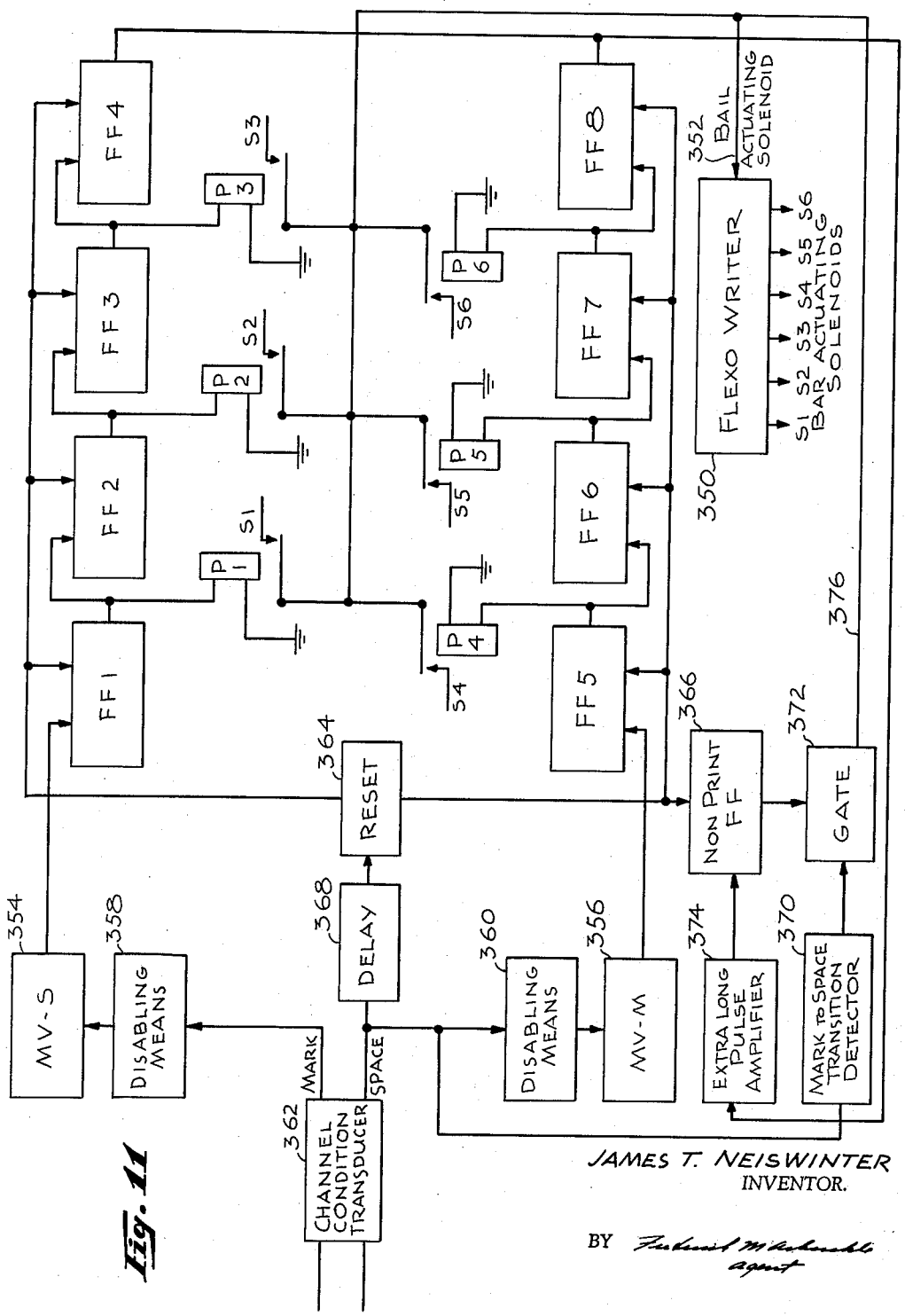

United States Patent Office 2,993,955
Patented July 25, 1961

2,993,955
CODED PULSE TRAIN COMMUNICATION SYSTEMS
James T. Neiswinter, 21 Jefferson St., Garden City, N.Y.
Filed Mar. 19, 1959, Ser. No. 800,462
19 Claims. (Cl. 178—17)

The present invention relates to improvements in communication systems, and, more particularly, to coded pulse train systems of the type useful in remote control and printing telegraph communication.

Numerous systems of coded pulse train communication are well known in the art. Such systems usually depend upon controlling the condition of a communication channel as between one of two modes on a time selective basis. Generally, the idle condition of the channel is termed a "mark" condition (or mode), while the alternate condition is termed a "space" condition (or mode). By alternating the condition of the channel between mark and space, a series of mark and space pulses are produced which may be timed in accordance with some code to represent certain functions it is desired be performed at a receiving station coupled to the channel. These functions may be various in nature, as the switching of communication terminal equipment, the control of railroad track switching, or the printing of specific characters of the alphabet on a page or tape so as to create written text.

Perhaps, one of the most widely used systems of this type is that known as the "start stop" Teletype system of printing telegraphy. Each character of the alphabet, various symbols and certain teletypewriter printing control functions are represented by a coded pulse train of fixed duration, each pulse train being defined by a fixed number of pulse intervals, each interval, in turn, being of a predetermined time duration. Generally, the first pulse interval of each train is represented by a space condition of the channel and is termed the "start pulse" of the coded pulse train. This start pulse is, then, followed by five binary type pulse coding intervals of the same duration as the start pulse, any one of these pulse coding intervals being represented by either a mark or a space condition of the channel. These conditions of the channel during these pulse coding intervals are sometimes termed "the coding pulses" of the teletypewriter system. Following the fifth coding pulse, a "stop" pulse is sent which is always defined by a fixed duration mark condition of the channel. This stop pulse is usually 1.4 times longer than the start pulse, or any one of the five coding pulses following the start pulse. If the duration of the start pulse is used as a time reference which is termed a "unit pulse interval," the duration of the whole teletypewriter code train then becomes 7.4 unit pulse intervals, or 7.4 unit pulses long.

In the above-described teletypewriter system, it can be shown that at 60 words per minute, the length of a unit pulse is approximately 22 milliseconds in duration, while at 75 words per minute, the unit pulse length becomes approximately 17.5 milliseconds. Since the five coding pulses following the start pulse are the only pulses which are conditionally mark or space, these pulses alone comprise that aspect of the teletypewriter coded pulse train used in conveying function-actuating information or information as to what character it is that is to be printed or what function is to be performed at the receiving terminal. These five coding pulses, in accordance with binary coding techniques, then permit of $2^5=32$ combinations and, thus, 32 different functions or characters may be represented. By adding a sixth code pulse, the pulse train is lengthened to 8.4 unit pulse lengths. However, this then permits $2^6=64$ different functions to be represented as is required in certain more elaborate Teletype payroll, type setting and data transmission systems.

As is immediately apparent in such a system, a synchronous relation must be maintained between the sending and receiving station. This is presently accomplished by motor-driven mechanical transducers at both the sending and receiving terminals, the receiving transducer being synchronously controlled by the start pulse of each teletypewriter code train. These transducers are of a brush distributor type configuration which permit the transmission and sensing of either mark or space conditions in the channel during the coding interval.

Where the transmission from the sending terminal to the receiving terminal is to be continuous and at full capacity with respect to time interval alloted to a coded pulse train, such capacity transmission being provided by the well known teletypewriter transmitter distributor operating from prepunched tape, a momentary hit or discontinuity in the channel may result in lack of synchronization between the receiver and the sender. This often produces the loss or garbling of many characters until mechanical synchronization is re-established between the sender and the receiver.

The present invention embraces a coded pulse sending and transmission system which overcomes many of the disadvantages inherent in the above type of teletypewriter coded pulse train transmission system. Whereas, in the teletypewriter system of communication, the pulse trains defining each of the different functions to be performed are all of the same time duration, the novel method and system of the present invention, in transducing function representing information into coded pulse trains, results in a pulse train whose alternate timed intervals may be of various and different duration. From another standpoint, the above "start stop" teletypewriter system, when employing 5 coding pulse intervals, permits of 8 possible changes in the condition of the channel during the transmission of a character. The coding system of the present invention, however, only permits a maximum of 3 changes in the condition of the channel for any character or function being transmitted. Thus, by means of the present invention, character and function information of the printing telegraph variety may be transmitted with a significant reduction in the required band width of the communication channel, and since no synchronous mechanical transducers are required, line hit vulnerability is greatly reduced. In a preferred form of the present invention, at least a fifty percent increase in the rate with which information may be communicated over a given channel is appreciated over that provided by the above-discussed "start stop" method of printing telegraphy.

More specifically, one form of the present invention provides a coded pulse train system of communication in which the condition of the communication channel is changed only three times for the first and last meaningful elements of the character or function information it is desired to transmit to the receiving station, with the requirement of only two changes in the channel condition for each element or character between the first and last element of the transmission. In a typical case, the idle or mark condition of the channel is first changed to a space condition, then to a mark condition and, subsequently, back to the space condition to define the first function. Thereafter, for each additional function or character the line condition is changed only twice, that is from space to mark and then from mark to space again up to the last meaningful element. The last meaningful element of the transmission then comprises a code train defined by 3 changes, i.e., mark to space and space to mark and then from space to mark. This last or third change preferably defines a non-print (or blinding non-valid code) in response to which the receiver performs no printing function.

As will become apparent hereinafter, the requirement for an "end of transmission" pulse code train can be obviated, in accordance with the present invention, by providing means for sending a blind "start space" at the beginning of signal transmission with each following "mark space" pair comprising the two condition coded pulse trains of the present invention. By controlling the time duration of each pair of space and mark conditions in accordance with a time code representing the various desired functions, a very effective and efficient system of communication is afforded.

In a typical system of the character embraced by the present invention, means are provided at the sending terminal for controllably changing the condition of the communication channel between space and mark conditions. Program means are then provided for representing each of the various functions, or characters of a printing telepgraph system, in terms of one space pulse interval and one mark pulse interval, the combination of the space and mark pulse interval timing, for any given function, being different from the time durations of corresponding pulse intervals assigned to any other function. This program means is then employed to actuate the channel condition controlling means so that each different function or character is represented by two alternate channel conditions, the first, for example, consisting of a space condition of specific duration followed by the second or mark condition of specific duration or vice versa. The specific and relative timing of the space and mark conditions, taken in combination, which define a given function is, therefore, different for each different function stored by the program means. A pulse code train of the present invention is, therefore, characterized in that anly function or character is represented by only two pulses defined by alternate channel conditions.

As will be seen hereinafter, in a preferred form of the present invention, means are provided at the sending terminal to so time the mark and space intervals of the code train that each is an integral multiple of a basic time unit termed a "unit pulse code interval." This affords significant simplification of the sending and receiving terminal equipment.

In a further preferred form of the present invention, it is contemplated that, where the band width of the communication channel is substantially limited, the minimum time permitted for any space or mark condition is in excess of one unit pulse.

In further accordance with the present invention, where a printing telegraph communication system is contemplated, the program means at the sending terminal is so set up that those characters of the alphabet which occur more frequently in the written text of the language being communicated are assigned pulse code train intervals which are of lesser duration than those pulse code train intervals assigned to characters or functions less frequently encountered in the transmission of intelligence. Since these more frequently used pulse code trains may be substantially shorter than the pulse code trains employed by other printing telegraph systems, more intelligence can be transmitted per unit time over a given communication channel than that permitted by such prior art systems. Also, in view of the fact that in printing telegraphy, the spacing function used by the printing telegraph machine is very frequently utilized, the present invention contemplates that in addition to assigning short duration code trains to letters such as the vowels and certain frequently used consonants, a short duration code train will also be assigned to the spacing function.

In accordance with a preferred form of the present invention, it is contemplated that the transmitter or sending apparatus be provided with a coding program means comprising a perforated sending tape of the type used in the well known Multiplex system of printing telegraphy. In accordance with the present invention, one part of the possible tape perforations associated with a character or function is employed, on a binary basis, to time the space portion of the code train employed in the present invention, while another part of these perforations is employed to time the mark portion of the code train.

In such a sending apparatus, it is further contemplated, by the present invention, that the step by step advance of the sending tape be controlled by means sensing that channel condition indicating the end of the first pulse interval defining a two element coded pulse train of the character embraced by the present invention.

At the receiving terminal of the system, means are provided for responding to mark and space conditions of the channel. Timing means are then employed for measuring the duration of each of the pair of space and mark conditions representing a given function or character. Means are then provided for transducing this time duration information into the selective actuation of various functions at the receiving terminal it is desired be performed.

In further accordance with the present invention, the actuation of the function performing means at the receiving terminal is conditioned upon only one of the two possible specific transitions of the communication channel from space to mark or mark to space. Thus, in a preferred form of the present invention when applied to a printing telegraph system, the actual printing of one character does not occur until the mark to space transition associated with the beginning of the following character occurs.

It can, therefore, be seen that in accordance with the present invention, a momentary hit or discontinuity in the channel will do nothing more than interfere with the communication of that specific character or function information being transmitted at the time of the hit or discontinuity and possibly the following character.

Still further, it is contemplated, in the practice of the present invention, that means be provided at the receiving terminal for sensing the occurrence of space and mark intervals whose durations do not correspond to predetermined values of coding intervals assigned to the transmission of valid character or function information. Such means are then employed to prevent the actuation of any function at the receiving terminal as by withholding operating power from appropriate function actuating circuitry.

At the receiving terminal, the present invention, in one of its preferred forms, employs a mark and a space counting circuit, each of a binary type comprised of a plurality of bi-stable circuits so arranged as to register successive counts by establishing different combinations of circuit stabilities for each discrete count. These counting circuits are controllably stepped in accordance with the number of unit pulse intervals embraced by the space and mark conditions, respectively, of the communication channel which define the code of the present invention. For each counting circuit, a set of conductive bus bars is provided equal in number to the number of discrete values of count the counter is relied upon to register. A source of signal is then connected to each bus bar through a dropping impedance, with diode elements connected from the various bi-stable circuits in current demanding relation to the buses so that for any given desired count only one bus associated with a given counter circuit has a potential substantially different from the other members of its set. The input circuit of a semiconductor device is then connected to desired bus bars of each counter. Various function-activating means, to be selectively activated in accordance with discrete combinations of count held by the counting circuits, are actuated by connecting such means between the output circuits of two of said semiconductor devices, one device being associated with the mark counting circuit and the other device being associated with the space counting circuit.

A better understanding of the present invention, as well as an appreciation of the above and many other features of advantage, will be obtained by a reading of the following description especially when taken in connection with the accompanying drawings, in which:

FIGURE 3 is a block line representation depicting the elements and interconnection thereof comprising one form of transmitter apparatus or sender useful in developing the code train depicted in FIGURE 2;

FIGURE 5 is a schematic representation of a transmitter or sender embraced by the present invention which carries out the general functions depicted by the block diagram of FIGURE 3;

FIGURE 6 is a block and line representation of one form of receiving apparatus useful in accordance with the present invention to transduce the coded pulse train depicted in FIGURE 2 into the operation of various functions at the receiving terminal such as the printing of written text;

FIGURES 7A and 7B depict in schematic form one type of receiving apparatus capable of carrying out the general functions indicated in the block diagram arrangement of FIGURE 6;

FIGURE 8 is a tabulation of certain circuit conditions attending the operation of the receiving apparatus depicted in FIGURE 7;

FIGURE 9 and FIGURE 10 show still other forms of transmitting and receiving arrangements embodying the present invention; and FIGURE 11 is a block diagram representation of another form of receiving apparatus contemplated by the present invention suitable for control of the well known "Flexo-Writer" type of printing telegraph receiver.

Figure 1:
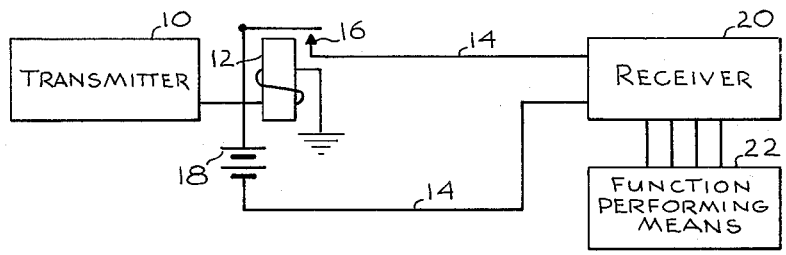
FIGURE 1 is a combination block and schematic representation of the elements comprising a basic communication system in which the present invention finds advantageous use.

Turning now to FIGURE 1, there is shown a typical coded pulse train communication system, to which the present invention may be applied, in which a transmitter 10 is adapted to operate a relay 12 in accordance with some pulse train coding system. The relay 12 is generally designated as a line relay and has as its function to control the condition of some form of communication channel here, by way of example, comprised of wire lines 14. The line relay 12 in the normal or idle condition of the channel remains actuated so as to permit the battery 18, through relay contacts 16, to produce an idle current in the channel which is sensed by a receiver 20. In accordance with some predetermined code, the transmitter 10 enforces release of the relay 12 so as to interrupt the current in the channel to produce alternating conditions of current and no current, respectively. The idle or "current" condition of the line is generally referred to as the "mark" condition of the channel while the alternate, "no current" condition is termed the "space" condition of the channel. A receiver 20 responds to these attending conditions to selectively actuate various function-performing means within block 22. For illustration purposes, these various functions as are indicated within the block 22 may correspond to the elements of a printing telegraph apparatus.

As brought out hereinabove, in the "start stop" method of printing telegraphy, the transmitter 10 produces a coded pulse code train which is of the same fixed time duration for each character or function it is desired be performed at the receiver 20. Each coded pulse train may be analyzed or broken up into seven intervals. The first interval is termed the "start pulse interval" of the pulse train while the last interval is termed the "stop pulse interval." The start pulse interval is always a space condition in the communication channel while the stop pulse interval is always a mark condition in the channel. Between the start and stop pulse intervals variously referred to as the start and stop pulses, five coding intervals are provided to make up the total complement of seven timing intervals. Each of the five coding intervals may be either mark or space conditions as defined by a transmitter 10 for a specific character, but each coding pulse is of the same duration as the start pulse. Each of the code intervals or code pulses may, therefore, be either mark or space thereby permitting $2^5=32$ different binary combinations or functions to be transmitted to the receiver 20. Thus, regardless of the character or function being transmitted to the receiver, a fixed time interval of one start pulses, five coding pulses and one stop pulse is required. In the well known teletypewriter system where the stop pulse is 1.4 times longer than the start and coding pulses, the code train for any specific character or function may be considered as being 7.4 unit pulses long, where the time interval of the start pulse is used as the timing reference termed "one unit pulse code interval."

*Coded pulse train of present invention*

Figure 2:
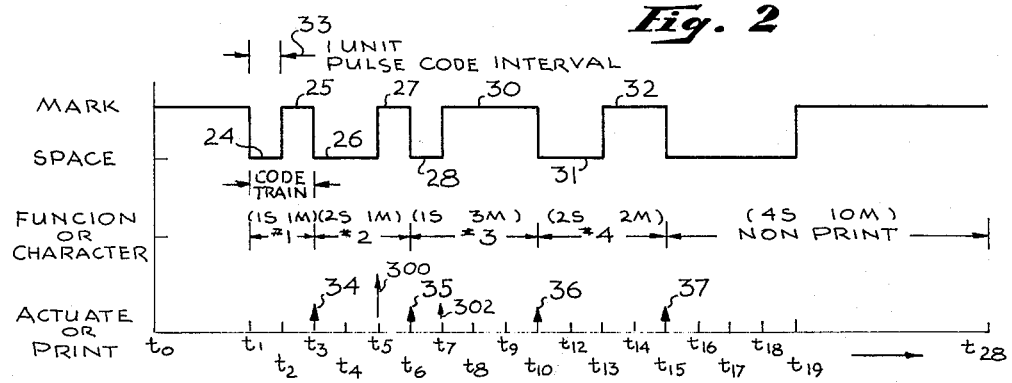
FIGURE 2 is a graphic representation depicting the character of the pulse code train contemplated by the present invention.

As shown in FIGURE 2, the coded pulse train of the present invention differs in substantial respects to the well known "start stop" code signal. As shown in FIGURE 2, in accordance with the present invention, each coded pulse train representing a given character or function is depicted by a pair of alternate line conditions which pair is, for example, made up first of a space condition of the line followed by a mark condition of the line. Therefore, in FIGURE 2, the normal or idle condition of the line, such as indicated at time $t_0$, is indicated as a mark condition. The beginning of the first function or character (the terms "function" and "character" being used interchangeably throughout the specification to represent intelligence as to desired actuation of a certain function performing means at the receiver), commences at time $t_1$, where the channel condition is changed from mark to space. The end of the first character is then defined at time $t_3$ where the line or channel (the terms "line" and "channel" being used interchangeably) again is caused to go from mark to space. The second character than begins at time $t_3$ (corresponding to the end of the first character), and continues to time $t_6$. The pulse code trains for characters 3 and 4 are, respectively, depicted as extending from time $t_6$ to time $t_{10}$ and from time $t_{10}$ to time $t_{14}$.

It will be noted in FIGURE 2 that each of the coded pulse trains is made up of a space condition and a mark condition. By way of example, the function or character No. 1 is defined by a space condition 24 followed by a mark condition 25. The code train for the character No. 2 also comprises a space condition 26 followed by a mark condition 27. Likewise, characters 3 and 4 are made up of a space condition 28 followed by a mark condition 30, and space condition 31 followed by mark condition 32. (The non-print function following character No. 4 will be discussed later.) It will be noted, however, that in a preferred form of the present invention, each of the space and mark conditions comprising a given code train is an integral multiple of that which is termed a "unit pulse code interval." In FIGURE 2, the unit pulse code interval is indicated at 33 and is an interval of time equal to that extending between time $t_1$ and time $t_2$. Character No. 1 is, therefore, represented by a pulse code train having a space condition of one unit pulse code length and a mark condition of one unit pulse length. Character No. 2 is, in turn, represented by a space 26 of two unit pulses and a mark 27 of one unit pulse. Character No. 3 is represented by a space 28 of one unit pulse length and a mark 30 of three unit pulse lengths. Similarly, character No. 4 is represented by a space (31) of two unit pulse intervals and a mark 32 of two unit pulses. As will become more apparent hereinafter, it is desirable, in the practice of one form of the present invention, to follow the last character it is desired to send with a pulse code train representing some form of non-print function or, alternatively, specifically conform the pulse code train following the last character to be printed with a code train having a space or a mark interval of sufficient duration as to prevent printing or carrying out of any function at the receiving location—this latter being accomplished by specific means contemplated by the present invention to prevent erroneous codes and line discontinuities from producing printing or actuation of functions at the receiver. Thus, for simplicity in notation, character No. 1 may be defined as (1S 1M), character No. 2 (2S 1M), character No. 3 (1S 3M), character No. 4 (2S 2M), where S and M refer, respectively, to space and mark conditions of the channel. As is apparent from the presentation of FIGURE 2, the actual printing of a given character, or the actuation of a given function, is carried out at a time at or after the beginning of the next successive character or function. Thus, character No. 1 would be printed, in accordance with the present invention, at a time substantially corresponding to $t_3$ as indicated by arrow 34. Character No. 2 would print at time $t_6$, as indicated by arrow 35. Characters 3 and 4 would print at times substantially corresponding to $t_{10}$ and $t_{14}$, respectively, as shown by arrows 36 and 37.

Although the present invention is in no way limited to the specific number of unit pulses employed in either the mark or space intervals of a code train representing various characters, it will be apparent that the 32 combinations afforded by the five pulse binary teletypewriter code can be realized by allotting a maximum of 4 unit space pulses and 8 unit mark pulses to code trains of the present invention, so that 4×8=32 different combinations are available. If a 64 combination code were desired, it is apparent that a maximum of 8 unit space pulses and 8 unit mark pulses could be assigned as the maximum which any character would employ. For ease in description, the following discussion of the various embodiments of the present invention will be based upon the use of a maximum of four space unit pulses and eight unit mark pulses for any given character.

*Transmitting system*

Figure 4:
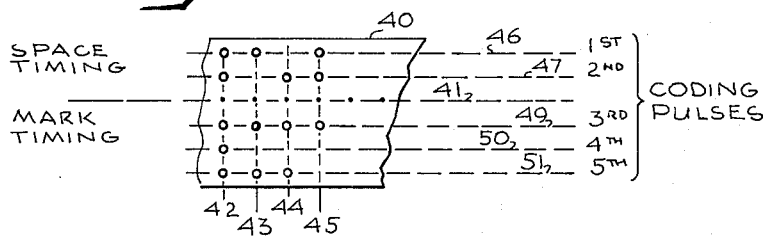
FIGURE 4 is a representation of the standard teletypewriter perforated tape now in general use in automatic teletypewriter equipment and useful as a program storage unit in connection with sending apparatus of the type depicted in FIGURE 3.

A preferred form of transmitter arrangement based upon the availability of four unit spaces and eight unit marks for any coded pulse train is broadly indicated in FIGURE 3. The message or text to be transmitted is held by some program means such as a tape-sending unit 38 shown in FIGURE 3. The tape-sending unit 38 may be of a variety similar to that used in the above-mentioned Multiplex printing telegraphy system which employs a perforated-sensing tape of the general character indicated in FIGURE 4. The Multiplex printing telegraphy system as well as the above-mentioned "start stop" system of Teletype printing telegraphy, is discussed in some detail on pages 11–20 to 11–24 of the Electrical Engineers Handbook, "Electric Communication and Electronics" edition by H. Pender and K. McIlwain, 3rd edition, 1941, published by John Wiley and Sons, Inc., New York City, New York, U.S.A. Such a tape generally comprises a paper base 40 in which a plurality of tape advance perforations indicated (in FIGURE 4) along the horizontal dotted line 41 are provided for permitting the tape to be advanced step by step within a tape sending unit. In alignment with each of the tape advance perforations are vertically extending rows of perforations such as indicated along dotted lines 42, 43, 44 and 45. Thus, by controllably positioning the perforations in rows 42, 43, 44 and 45, the mark space configuration of the coded pulse portion of prior art teletypewriter signals may be defined. This may be more easily seen by reference to the horizontally extending rows defined by dotted lines 46, 47, 48, 49 and 50 indicated as, respectively, corresponding to the first, second, third, fourth and fifth coding pulses of a 5 element teletypewriter pulse code train. The tape sending unit 38 in FIGURE 2, as is well known, includes means for examining or sensing the arrangement of perforations along any of the vertical rows of tape 40 (FIGURE 4), each row being examined one at a time, while the tape is being advanced on a step by step basis through the sending unit. If, for example, the perforation sensing means in the tape sending unit 38 operates upon row 42, there will be indicated that the first, second, third, fourth and fifth coding pulses of the teletypewriter pulse train are all space pulses. Likewise, when the perforations of vertically extending row 43 are examined by the perforation sensing means, there will be indicated that the first, third and fifth pulses of the teletypewriter code signal are space conditions, all others being mark.

In accordance with the present invention, however, in which each coded pulse train may be of different duration and comprised solely of one space condition followed by one mark condition, each of controllable time duration, the coding perforations on the tape such as shown in FIGURE 3 are used to define, in a binary coding manner, the duration of each of the space and mark intervals. In the specific example being considered, where the maximum unit pulse length of the space is four unit pulse lengths long, and the maximum mark portion of a pulse train is eight unit pulses long, the perforations on a tape such as shown in FIGURE 3 may be used as binary program means. A group of two of the five perforations are employed to define coding intervals of unit pulse length one to four, while the other group of three perforations are employed to define coding intervals of unit pulse length one to eight. Purely by way of example, in FIGURE 3, the first and second coding perforations possible in any vertically extending row, for example, row 42, are utilized to define the space interval of the coded pulse train embraced by the present invention. Correspondingly, the third, fourth and fifth possible coding perforations in any vertically extending row are employed in a binary coding fashion, to define the mark portion of the code train used in the present invention. It is, therefore, seen that the two perforations in each vertical row may, when taken in various combinations, define one of four possible unit lengths for the space portion of the coded pulse train employed in the present invention. Likewise, the three perforations serving the mark portion of the coded pulse train embraced by the present invention may, in accordance with binary coding techniques, define eight different time durations for the mark portion of the train.

Turning now again to FIGURE 3, the tape sending unit 38 is shown to operatively include a tape sensing means 52, a perforation sensing means 53 and a tape stepping means 54. It is the function of the tape sensing means 52 to determine whether or not a tape of the character shown in FIGURE 3 is, in fact, inserted in the tape sending 38, which information is useful in controlling auxiliary means for applying operating power to the sending unit and transmitter. The perforation sensing means 53, on the other hand, performs the above-described task of analyzing the configuration of perforations in the tape to determine what duration the space and mark conditions of the pulse code train in FIGURE 2 has been programmed. Tape stepping means 54, on the other hand, is responsive to input signals thereto to cause the advance of the tape 40 so that the tape sending unit 38 may sense or analyze the next successive row of perforations.

In accordance with the present invention, the arrangement shown in FIGURE 3 includes a counting circuit 55 which is connected in driven relationship to a timing signal source 56. The timing signal source 56 may, as will become hereinafter apparent, a multivibrator whose natural period corresponds to the unit pulse code interval 33 shown in FIGURE 2. The counter circuit 55 is provided with counter setting means 57 which may be caused to establish the condition of the counter 55 at any predetermined value of count as specified by either a mark counter-set circuit 58 or a space counter-set circuit 59. Each of the mark counter-set and space counter-set circuits 58 and 59 are responsive to the configuration of perforations along the row of tape perforations being sensed by the perforation sensing means in the tape sending unit 38 at any given time. Thus, the perforation sensing means 53 will apply to the mark counter-set circuit 58 information as to the required duration of the mark portion of the coded pulse train envisioned by the present invention. Likewise, the perforation sensing means 53 will apply to the space counter-set circuit 59 information as to the required duration of the space interval of the coded pulse train envisioned by the present invention. In the case where character No. 1 in FIGURE 2 were being transmitted, the tape sending unit 38 would, by means of its perforation sensing means 53, indicate to the space counter-set circuit 59 that the next space condition of the line should be of one unit pulse duration. Likewise, the mark counter-set circuit 58 would receive information that the next mark portion of the code train should be of one unit pulse code interval duration.

Before considering the action of the mark and space counter-set circuits 58 and 59 in controlling the counter 55 to develop a coded pulse train in accordance with the present invention, it will be noted that the condition of the line or channel 60 is controlled by a send relay 61. The relay 61 is shown in its idle deactivated condition so that contacts 62 thereof place the battery 63 in circuit with a receiver connected to the line 60 as indicated by arrows 64. The condition of the send relay 61 is, in turn, governed by the state of a bi-stable multivibrator 65 which, in the idle condition of the transmitter, does not develop the proper polarity of voltage at terminal 66 thereof to actuate the relay 61 through the diode 67. The condition of the multivibrator 65 is, in turn, controlled by the occurrence of signals at input terminals 68 and 69 thereof. Terminal 68, designated "in" may be termed the control input terminal of the multivibrator inasmuch as the appearance or application to this terminal of a pulse will recondition or flip the multivibrator 65 to a state opposite to that which it assumed prior to the occurrence of the input pulse. Terminal 69, designated "C," however, may be referred to as a reset terminal inasmuch as the occurrence of a signal or pulse at this terminal will always condition the multivibrator 65 to that particular condition in which the send relay 61 is not actuated, or more generally, that condition of the multivibrator producing the idle mark condition in the communication channel.

In the arrangement of FIGURE 3, it is noted that, under idle conditions, the timing signal source 56 is maintained inactivated by means of a hold circuit indicated at 70. Likewise, the counter circuit 55, under idle conditions, is held inactivated and in a reset condition (corresponding to zero count or end of count for the counter circuit) by means of hold and reset circuit means 71. The above-described idle condition of the bi-stable multivibrator 65 is, likewise, enforced by a reset circuit 72 which, under idle conditions, applies a signal to the reset terminal 69 of the multivibrator to flip it to a condition which releases the send relay 61, thereby maintaining the normal idle mark condition in the communication channel. The counter circuit 55 is also provided with an end of count sensor circuit 73 which causes the application of a signal to the input of multivibrator 65 whenever the counter 55 reaches its end of count. The condition of the reset terminal C at 69 on multivibrator 65, however, overrides any influence of signals applied to the multivibrator from the end of count sensor 73. By means of armature 74 on send relay 61, which armature cooperates with contacts 75 and 76, the counter setting means 57 is placed in controlled relation to either the mark counter setting circuit 58 or the space counter setting circuit 59. Also by means of send relay armature 77, cooperating with contact 78, it will be seen that whenever the send relay is actuated to produce a space condition on the communication channel, the source of potential having a terminal at 79 is disconnected from the differentiating circuit including capacitor 80, to permit capacitor 80 to discharge through its associated resistors. However, upon subsequent release of armature 77 when the space interval is ended, a pulse of positive voltage is applied, through capacitor 80 to tape stepping means 54 causing the advance of the tape one step to the next character. Finally, it will be noted that a disabling means 81 is provided which, in response to the presence of a perforated tape in a tape sending unit, as sensed by the tape sensing means 52, disables or releases hold means 70, hold and reset means 71 and reset means 72, thereby permitting the counter 55 to count and the multivibrator 65 to flip to its space condition.

In the operation of the transmitter or sending arrangement of the present invention as shown in FIGURE 3, it will be seen that under idle conditions the send relay 61 is released to produce an idle mark condition in the channel comprising the wire line 60. Upon placing the tape 40 in the tape sending unit 38, the tape sensing means 52 acts upon the disabling means 81 to release the influence of hold means 70, hold and reset means 71 and multivibrator reset means 72. Thus, the timing signal source 56 will commence the generation of a pulse train 82, the period of which pulse train is equal to one unit pulse of the code train envisioned by the present invention. Likewise, the bi-stable multivibrator 65 will be flipped to its off-idle condition, thereby actuating the send relay 61 to begin a space condition in the line 60.

Still referring to FIGURE 3, upon actuation of the send relay to produce a space condition in the channel the counter setting means 57 will receive information through armature 74 and contact 76 of the send relay from the space counter set circuit 59. The space counter set circuit 59 will, then, cause the counter setting means 57 to immediately condition the counter to a state corresponding to the count $N-U_s$, where N is the maximum count of the counter and $U_s$ is the number of unit pulses for which the space condition is to endure or continue in defining the first character. The counter 55 will, then, commence counting the pulses 82 from the timing signal source 56 until the counter reaches its end of count condition. At this time, the end of count sensor 73 flips the bi-stable multivibrator 65 back to its idle or mark condition to actuate the send relay 61, thereby producing a mark condition on the channel 60. However, upon the release of send relay 61 to produce a mark condition in the channel, armature 77 of the send relay dropped to contact 78, thereby applying battery potential to the capacitor 80 which, in turn, applies a momentary pulse to the tape stepping means 54, thereby advancing the tape one step. However, before the actual mechanical advance of the tape can be accomplished by the tape stepping means 54, the counter setting means 57 has been re-actuated, this time by the mark counter set circuit 58 acting through line relay terminals 74 and 75. Thus, the counter 55 will again be set to some count $N-U_M$, where $U_M$ represents the number of unit pulses assigned to the mark condition of the coded pulse train defining the character initially being transmitted. Subsequent or immediately following the mark condition setting of the counter 55, the counter will begin to count the pulses from the timing signal source 56 until it reaches its end of count at which time the multivibrator 65 is again flipped to actuate the send relay 61 to produce a space condition on the line, this defining the beginning of the next character to be sent. The timing of this space interval will now be established by the space counter set circuit 59 in response to a new set of perforations sensed by the perforation sensing means 53. The above-described action will continue until the end of the perforated tape at which time the tape sensing means 52 will act upon the disabling means 81 to return the transmitting circuit to the above-described idle condition.

It can, therefore, be seen that the coded pulse train of the present invention depicted in FIGURE 2 will be developed, in response to a program means which may, by way of example, be a perforated tape of the multiplex printing telegraphy variety. It will be understood that the successful development of the novel coded pulse trains representing various functions and characters in accordance with the present invention is in no way limited to the specific program, timing and channel condition controlling arrangements shown in FIGURE 3. The programming means shown in FIGURE 3 comprising the tape sending unit 38 may, of course, be replaced by other types of data storage devices such as magnetic tape and photographic film strips. Likewise, the timing means comprising the timing signal source 56, counter 55 and counter setting means 57 can be replaced by other electrical circuitry and/or mechanical motor driven timing means.

Specific form of transmitter

However, in a preferred form of coded pulse train developing apparatus or transmitter, the present invention contemplates the novel arrangement shown in FIGURE 5 of the drawings. For ease in illustration, the circuit arrangement shown in FIGURE 5 is shown partly in schematic form and partly in standard relay-line format. The general operation of the transmitter or sender arrangement shown in FIGURE 5 is similar in nature to that described in connection with the block diagram representation of the transmitting system shown in FIGURE 3. Accordingly, in FIGURE 5, it will be assumed that the program for the sending operation is held by a standard five hole teletypewriter tape which has been prepared by an operator who has punched the tape using any standard means for this purpose. The tape will be run through a tape sending unit having five perforation sensing pins and associated contacts which comprise the perforation sensing means 53 of FIGURE 3. These perforation sensing pin contacts are indicated at 101, 102, 103, 104 and 105, respectively, in FIGURE 5.

In one form of conventional tape sending unit or tape reader, each of the perforation sensing pins closes a contact when it encounters a hole in the tape. Thus, in FIGURE 5, the perforation sensing pin contacts 101 through 105 are indicated as being normally open, each being conditionally closed only when a perforation is sensed by the perforation sensing pin associated with that particular contact. A sixth sensing pin at 106, in FIGURE 5, is shown which, in accordance with conventional practice, is so positioned within the tape sending unit as to close its associated contact whenever a tape is placed in the sending unit.

A start relay 107 is, therefore, conditioned for energization upon the existence of a tape within the tape sending unit, and the manual closing of a start switch 108. As in the arrangement of FIGURE 3, a sending relay 109 is provided for controlling the condition of a communication line circuit 110. In the released condition of relay 109, the line circuit 110 is held in a mark condition. Relay 109 is, in turn, controlled by a transistor amplifier 111 which is, in turn, driven from the output of a bi-stable multivibrator 112 hereinafter variously referred to as FF 5 (T), the letters FF indicating a bi-stable multivibrator of the flip-flop variety. For ease in description throughout the remainder of this specification, the term multivibrator, unless qualified by the term bi-stable, will be considered as a normally continuously running oscillator. On the other hand, the term bi-stable multivibrator will be treated as synonymous with the well known flip-flop type of circuit.

Again referring to FIGURE 5, it will be seen that a counter circuit, comparable in function to that indicated at 55 in FIGURE 3, is indicated within the dotted line area 113. The counter circuit 113 includes flip-flop circuits FF 1 (T), FF 2 (T), FF 3 (T), FF 4 (T). Flip-flop circuits FF 1 (T) through FF 4 (T), as well as FF 5 (T) at 112, may be identical in circuit configuration and each of the character indicated within the block FF 1 (T) which is shown in some detail. For illustration simplicity, therefore, detailed circuit aspects of flip-flops FF 2 (t) through FF 5 (T) have been omitted. As a source of timing signal for the counter circuit 113, a multivibrator indicated as MV (T) at 114 has been shown. The counter 113 being of the four stage binary type will have the capacity of counting sixteen consecutive pulses from the timing signal source 114. Timing signal source 114 corresponds in function to the timing signal source 56 shown in FIGURE 3. In order to provide means for setting the counter 113 in accordance with desired mark and space interval information, a series of diodes $D_6$, $D_7$, $D_8$, $D_{10}$, $D_{11}$, $D_{13}$, $D_{14}$ and $D_{15}$ have been provided which conditionally pass signals developed by flip-flop FF 5 (T) at 112, in order to flip the counter flip-flops FF 1 (T) through FF 4 (T) to establish their conditions of stability corresponding to predetermined values of count. The delivery of these counter set signals from the flip flop FF 5 (T) at 112 through the various diodes to the counter flip-flop circuits is, in part, conditioned upon the state of the perforation sensing pin contacts 101 through 105.

For the specific code arangement under consideration, where a maximum of four unit pulse length intervals are to be alloted to the space portion of the coded pulse train and a maximum of eight unit pulse intervals are to be allotted to the mark portion of the coded pulse train, the tape sensing pin contacts 101 and 102 are assigned the function of determining the setting of the counter for timing the space portion of the coded pulse train. Correspondingly, tape sensing pin contacts 103, 104, 105 are asigned the functions of setting the counter for determining the duration of the mark portion of the coded pulse train. Finally, before considering in detail the operation of the arrangement shown in FIGURE 5, it will be noted that a tape stepping means comprising a tape step magnet 115 has been shown which, in turn, is controlled by a transistor amplifier 116, in turn, responsive to the condition of the flip-flop circuit FF 5 (T) at 112.

Prior to the placing of tape in the tape sending unit associated with the arrangement of FIGURE 5, it will be noted that the relay ST at 107, in its released condition by virtue of the sixth pin 106 not being closed, has held multivibrator MV (T) at 114 inoperative by grounding the base of transistor $T_1$ through the back contacts ST (1) at 126 of relay ST. Relay ST at 107 also held transistors $T_3$, $T_5$, $T_7$ and $T_9$, in the flip-flop circuits of the counting circuit, non-conducting by means of the ground applied to the bases of these transistors through back contacts ST (2), ST (3), ST (4) and ST (5). By holding these transistors non-conducting, the counter circuit was held in the configuration of count 16 (that is, its reset condition, alternatively referred to as zero count). The counter 113 being of the binary type, zero count and maximum count are defined by the same set of flip-flop conditions. Relay ST, in its inoperated condition, by means of its back contact ST (6) also held the flip-flop FF 5 (T) at 112 in a condition where transistor $T_{11}$ was non-conducting, this by virtue of the ground applied to the base of $T_{11}$. With $T_{11}$ non-conducting, $T_{12}$ will be conducting, and transistor $T_{14}$, at 111, which controls the line relay 109, will also be non-conducting. Line relay 109 will, therefore, be released to provide the desired idle mark condition of the communication circuit 110.

Assume now the insertion of tape into the tape sensing unit, which closes the sixth pin 106, and the manual closing of the manual start switch 108. Relay ST will then operate and the disabling holding ground applied to transistors $T_3$, $T_5$, $T_7$, $T_9$ and $T_{11}$ and flip-flops FF 1 (T) through FF 5 (T) will be removed which, in itself, will cause no change in these circuits. However, operation of relay ST will also remove holding ground from $T_1$ of MV (T) at 114. The removal of this holding ground from $T_1$ of the multivibrator MV (T) will permit this circuit to start producing a train of pulses such as 82 in FIGURE 3 for application to the counting circuit 113.

However, by virtue of the ground having been removed from flip-flop circuits FF 1 (T) to FF 5 (T), the condition of each flip-flop circuit will be subject to change by the appearance, at any of the "in" terminals of the circuits, of a negative-going pulse. It will, therefore, be noted that relay ST at 107, upon being actuated closed, the normally open contact ST (7) at 117 will be closed thereby applying a momentary negative-going pulse to the "in" terminal of flip-flop FF 5 (T) at 112. This causes the flip-flop FF 5 (T) to change its condition so that $T_{11}$ of FF 5 (T), normally non-conducting during a mark or idle condition, becomes conductive to send a positive pulse from terminal A through capacitor $C_7$ to perforation sensing contacts 101 and 102. If contact 101 happens to be closed due to there being a perforation in the tape at code position 1, the positive pulse will be sent through diode $D_6$ to cause idly conductive transistor $T_4$ to become non-conductive, thereby setting flip-flop circuit FF 1 (T) to the opposite condition from its idle or step 16 (zero count) condition. If tape sensing pin contact 102 happened to be closed, the positive pulse appearing at terminal A of flip-flop FF 5 (T) would also go through diode $D_8$ to make idly conducting transistor $T_6$ non-conducting, thereby flipping flip-flop circuit FF 2 (T) to the opposite condition to that corresponding to reset, idle, full count or zero.

Inasmuch as a positive going pulse at terminal A of flip-flop FF 5 (T) will always flip flip-flop circuits FF 3 (T) and FF 4 (T), by virtue of the diodes $D_{11}$ and $D_{14}$, respectively, it will be seen that the conditionally open or closed conditions of perforation sensing pin contacts 101 and 102 will cause the counter 113 to be set at either count 12, 13, 14 or 15.

Going back now to multivibrator MV (T) at 114, it will be remembered that it started running at the beginning of the space pulse under consideration, and it will commence sending positive pulses to the counter 113, at unit pulse intervals. The counter 113 will count once for each pulse. If the counter has been preset to count 12, it will, then, reach the count of 16 in the time of four unit pulses. If preset for count 13, it will reach step 16 in the count of 3 unit pulses, etc. When the counter reaches count 16 (corresponding to zero count, or idle condition), transistors $T_3$, $T_5$, $T_7$ and $T_9$ will be rendered non-conducting. In this configuration, the negative battery applied through resistor $R_{13}$ at 117 will be no longer shunted to ground by one or more of these odd numbered transistors, diodes $D_5$, $D_9$, $D_{12}$ and $D_{16}$ having previously drawn current through $R_{13}$ upon the condition of any one or more of the transistors $T_3$, $T_5$, $T_7$ or $T_9$ being conducting. The voltage on the right hand side of $R_{13}$ will, therefore, rise to its maximum negative value which is conveyed via diode 118 to the "IN" terminal of flip-flop FF 5 (T) at 112. The flip-flop FF 5 (T) will, then, flip back to its mark condition. The rise of the voltage at the right hand terminal of $R_{13}$ may then be seen as indicative of end of count.

When flip flop FF 5 (T) is returned to its mark condition, by virtue of the counter 113 having reached its end of count, a positive pulse will be produced at terminal B of flip flop FF 5 (T) causing the release of line relay 109 to produce a mark on the line. This positive pulse is also applied through capacitor $C_8$ at 119 to the perforation sensing pins contacts 103, 104 and 105. Inasmuch as this positive pulse is passed directly by diode $D_{15}$ to set flip flop FF 4 (T) of the counter 113, the condition of sensing pin contacts 103, 104 and 105 will determine at which of eight possible counts, 8 through 15, the counter is set. The multivibrator MV (T) continuing to run while tape is being sent, will then begin to step the counter circuit 113. When the counter circuit reaches count 16 (end of count), the potential at the right hand terminal of resistor $R_{13}$ at 117 will again rise and cause the flip flop FF 5 (T) to flip into the space condition which starts the space interval of the following character.

It will be noted that simultaneously with the sending of a positive pulse from the flip flop FF 5 (T) at 112 through capacitor $C_8$ to the sensing pin contacts 103, 104 and 105 a negative pulse will occur at terminal A of flip flop FF 5 (T). This negative pulse will cause transistor $T_{13}$ at 116 to conduct momentarily to operate the tape step magnet 115 and step the tape ahead one character. The stepping ahead of the tape one character, however, will normally change the combination of perforation sensing pins 103, 104 and 105 that are operated, but due to the relatively slow operation of the tape step magnet, the positive pulse through $C_8$ at 119 which sets the counter 113 for mark timing purposes will have disappeared and the rearrangement of tape sensing pins will not affect the setting of the counter at this time.

The positive pulse appearing at terminal A of the flip flop FF 5 (T) which occurs when this flip flop is flipped by virtue of the counter 113 having reached its end of mark count will again cause resetting of the counter to whatever count is established by the condition of contact tape sensing pin contacts 101 and 102 of the next character, thereby initiating the timing of the space interval of the coded pulse train defining the next character or function. The action above described thus continues on in the same manner with the configuration of holes in the tape for positions 1 and 2 determining the length of the space pulse sent to the line and the configuration of the holes 3, 4 and 5 determining the length of the mark pulse sent to the line. When the final meaningful character of the message is reached on the tape, it is necessary, of course, to provide one additional meaningless character, preferably one which does not cause the receiving typewriter to print such as, for example, a coded pulse train corresponding to a spacing function which, in any case, actually determines the end of most messages.

It will, therefore, be seen that through the use of a unitary counting circuit which is controllably reset in accordance with programmed code interval time data the condition of full count of said counting circuit defining the times at which a transition between two possible conditions of a communication channel shall occur constitutes a simple, accurate and effective means of delineating coded pulse train communimation signals.

*Receiver system*

In order to transduce the coded pulse train of the present invention into the selective actuation of certain functions or function performing means at a receiving terminal, as for example, the selective actuation of character printing devices in an electromechanical typewriter, the present invention contemplates a novel form of pulse duration measuring system. Broadly, means are provided for measuring the time duration of two successive but alternate channel conditions and remembering or storing information as to the time duration of the first channel condition until measurement of the second channel condition or measurement of the time duration of the second channel condition has been completed. After completing the measurement of the second channel condition, means are provided for selectively actuating one of a plurality of different functions or function actuating means in accordance with the time duration of the first channel condition as compared or related to the time duration of the second channel condition. Means are, then, provided for releasing the stored information as to the time duration of the first channel condition in response to the next change in the condition of the channel from the second condition to the first condition.

A preferred way of carrying out the functions performed by the above means is indicated in a rather general way by the block diagram shown in FIGURE 6. In FIGURE 6, the coded pulse train of the present invention, as shown in FIGURE 2, appears in the channel 125 which is connected to a channel condition transducing means 126. It is the function of the channel condition transducing means 126 to conditionally apply a signal to either output terminal 127, or output terminal 128, depending upon whether the condition of the channel is mark or space. It will be assumed that the transducing means 126 will produce a continuous signal at output terminal 127 whenever the condition of the channel is mark. When the condition of the channel goes to space, a continuous signal will be produced at output terminal 128 for the duration of the space interval. During a mark condition, it will be assumed no signal appears at the space output terminal 128 while during a space condition no signal will appear at the mark output terminal 127. The various functions which are to be actuated in accordance with the coded pulse train of the present invention are indicated by the block 129. As pointed out above, if the space interval of the coded pulse train is limited to a maximum of four unit pulses in duration and the mark interval of the coded pulse train to a duration up to eight unit pulses long, it will be possible to selectively actuate thirty-two different functions. The specific function, which is to be actuated in response to any given coded pulse train of the present invention, is determined by the presence of a signal on one of thirty-two different input lines, generally indicated at 130, connected to the function actuators 129. However, no function can be actuated unless power for the actuation is applied to the power input terminal 131 associated with the function actuators 129. Power for such a purpose is conditionally delivered by the function actuation power source 132 which may be effectively turned "on" or "off" by disabling means 133, but which requires a signal from a mark to space transition detector 148 before power is applied to function actuators 129. Under idle conditions of the receiver, the disabling means 133 is active to disable the function actuation power source 132 by reason of the condition of a non-print flip flop 134. The condition of the non-print flip flop 134 is set at one of its two stable conditions only by the application of a signal to the IN terminal 135 of the flip flop in which condition it remains until application of a signal to its R terminal 136. That condition of the flip flop 134 which is enforced by a signal applied to the IN terminal 135, however, causes the disabling means 133 to prevent function actuation power from being delivered to the function actuators 129.

The "IN" terminal 135 of flip flop 134 is, therefore, adapted to receive signal from an extra long count detector 136 which, in turn, receives count information from a space counter 137 and a mark counter 138. Both the space and the mark counters 137 and 138 are also provided with a reset circuit shown at 139 and 140, respectively. Reset circuits 139 and 140 are actuated to reset the space and mark counters in response to the first space condition of the channel. However, the actual reset function is delayed by less than a half a pulse length by a one-third pulse delay circuit at 141. The delay circuit 141 is, in turn, connected to the space terminal 128 of the channel condition transducing means 126. Space and mark counters 137 and 138 are adapted to be driven by sources of periodically recurrent pulses such as shown at 142 and 143.

In accordance with the present invention, the first count of either the space or mark counter circuits is caused to be delayed with respect to the actual occurrence of space and mark conditions on the communication channel such as by the one-half pulse delay means shown at 144 and 145, respectively. If the recurrent pulse sources 142 and 143 are of the multivibrator variety, as will hereinafter be illustrated, the pulse delay means 144 and 145 may be eliminated and the space and mark counter circuits connected to the appropriate halves of the recurrent pulse source multivibrators so as to realize a one-half pulse delay from the times the communication channel mark and space conditions are initiated. In order that the space and mark counters 137 and 138 may measure the duration of space and mark conditions delineating the coded pulse train of the present invention, disabling means 146 and 147 are provided so that during a mark condition of the channel recurrent pulse source 142 is disabled, while during a space condition of the channel recurrent pulse source 143 is disabled. The disablement of either pulse source, in effect, disables the time measuring function of what may be termed the respective space or mark time measuring channel in which the pulse source is found.

Finally, a transition detector 148 is provided for imposing final control upon the function actuation power source 132 so that no function actuation power is delivered to the function actuators 129 except in response to the actual transition of the communication channel from that condition defining the last portion of the code pulse train to the alternate condition. In the specific code embodiment of FIGURE 1, the transition detector 148 will perform its function in response to the transition from a mark condition to a condition of space. Thus, the mark to space transition detector 148 acts as means for enforcing the actuation of a function only upon the actual termination of that condition of the channel which defines the second part of the two part coded pulse train characterizing the present invention.

In the operation of the receiving circuit shown in FIGURE 6, it will be seen that under the condition of a continuous mark on the channel, corresponding to the idle condition of the system, the recurrent pulse source 143 will be actuated by virtue of no signal appearing at the space terminal 128 to actuate the disabling means 147. The mark counter 138 will, then, receive a continuous supply of counting pulses from the source 143 and will step one count for each pulse received. For those conditions of the counter 138 corresponding to the first eight counts of its capacity, corresponding voltages will appear, in a registering fashion, on the eight output terminals or lines 149. However, at some count in excess of eight counts, such as ten, for example, the mark counter 138 will cause a registering potential to appear at output line 150 thereof. This, as mentioned above, will actuate the extra long count detector 136 to flip the non-print flip-flop 134 to a condition which disables the function actuation power source 132, thereby preventing power from being applied to and possible actuation of the function actuators 129. Once the non-print flip-flop 134 has been flipped in response to an extra long count detection, it will remain in that condition until appropriately flipped to its alternate condition by a signal from a reset means 151 acting to conditionally apply signal to the R terminal of the flip-flop 134.

Thus, during the idle condition of the channel, the mark counter 138 continues to be driven through its various steps or stages of count by the recurrent pulse source 143 with the non-print flip-flop 134 disabling the function actuation power source 132 once an extra long count has been detected.

Upon the receipt of a coded pulse train of the character illustrated in FIGURE 2, the condition of the channel 125 will first assume a space condition. At this time, the mark representing signal condition appearing at mark terminal 127, of the channel condition transducing means 126, will disappear and cause the recurrent pulse source 142 (which actuates the space counter 137) to start generating unit pulses. The transition of the channel from a mark to a space condition would normally have caused the mark to space transition detector 148 to pulse the function actuation power source 132 so as to conditionally actuate some function at 129. However, it will be remembered that, during the idle mark condition of the channel, the function actuation power source 132 was disabled due to the extra long mark count sensed by sensor 136 which, in turn, flipped the non-print flip-flop circuit 134. The space signal representing condition of the space terminal 128, however, after a suitable delay such as one-third of a unit pulse interval, as provided by delay means 141, will actuate reset circuits 139, 140 and 151, this reset action occurring before the space counter 137 receives from delay means 144 the one-half unit pulse delayed version of the pulse delivered by the source 142. Actuation of reset means 139 and 140 resets the space and mark counter circuits 137 and 138 to their zero count condition. Mark Counter 138 will remain in zero count condition throughout the space interval, since upon the occurrence of the space condition, disabling means 147 halts the operation of the mark counter driving pulse source 143.

Following the initiation of the space condition in the communication channel by a suitable delay of, for example, one-third unit pulse, the reset circuit 151 acts to change the condition of non-print flip-flop 134 to that stable condition permitting the next mark to space transition detection to apply power to the function actuators 129.

The space counter 137 having been reset to zero count at a time prior to the first pulse from the source 142 reaching it, will then start counting the unit pulses delivered by the recurrent pulse source 142. The first four counts of the space counter 142 will produce corresponding signals to appear, one at each count, on one of the four space counter registering output terminals 152. Upon the end of the space interval, a mark signal will immediately appear at terminal 127 of the channel condition transducing means 126 in FIGURE 6. This will stop the recurrent pulse source 142 and the space counter will remain at rest at that particular value of count which it had registered at the time space interval ended and the mark interval began. Also, upon the beginning of the mark condition, recurrent pulse source 143 which drives the mark counter 138, will be enabled or started up to deliver unit pulses to the mark counter 138. The mark counter 138 having been previously reset, one-third of a pulse interval after the initial space condition of the coded pulse train will be in a position to count the number of unit pulse intervals embraced by the mark condition of the coded pulse train. At the end of the mark interval, the channel will again assume a space condition. The transition from the mark condition of the first character to the space condition of the second character will cause the mark to space transition detector 148 to actuate the function actuation power source 132 to apply function actuation power to the function actuators 129. The non-print flip-flop 134 having been reset by the initiation of the space condition defining the first character will then permit the actuation of one of the function actuators at 129. The particular function which is actuated will, of course, be determined by the function selector matrix 153. The function selector matrix 153 may be of any conventional form which is responsive to the signals appearing on mark counter register lines 149 and space counter register lines 152, to selectively develop function command information at but one of the lines 130 for any valid combination of space and mark interval durations defined by the code. A preferred form of function actuation control responsive to space and mark counters of the binary type will, however, be described in connection with the more detailed receiver system shown in FIGURES 7A and 7B hereinafter.

Turning now to FIGURE 7A and FIGURE 7B, taken in combination, a preferred form of transistorized coded pulse train receiving system employing a novel function selecting matrix system is illustrated. FIGURES 7A and 7B may best be read with FIGURE 7A placed immediately above 7B. Terminal connections P, Q, T, U and V, in FIGURE 7A, are to be read as directly connected to corresponding terminals P', Q', T', U' and V' in FIGURE 7B. In the arrangement shown, a line relay L at 202 (upper left hand corner of FIGURE 7A) is shown having an armature 204 cooperating with contacts 205, 206, 207 and 208. The line relay L with its associated armature and contacts corresponds to the channel condition transducing means 126 of FIGURE 6. A unit space counting circuit of the binary type is indicated in the dotted line area 137' of FIGURE 7A, which counting circuit is connected to conditionally receive pulses from a recurrent pulse source afforded by multivibrator MV–S in dotted line area 142'. The space multivibrator MV–S is, in turn, adapted to be disabled whenever terminal 210 thereof is connected to ground through line relay contact 205 and armature 204. Thus, when the channel is in its idle mark condition, line relay 202 will be actuated to disable the multivibrator MV–S. When line relay 202 is released, in response to a space condition on the line or channel, multivibrator MV–S will commence operation to drive the space counter 137' with positive-going actuating pulses appearing at terminal 212.

Similarly, in the arrangement shown in FIGURE 7B, there is provided a mark counting circuit shown within dotted line area 138'. The mark counting circuit 138' is, in turn, adapted to be driven from a recurrent pulse source comprised of multivibrator MV–M indicated within dotted line 143'. Multivibrator MV–M is adapted to be disabled by line relay L upon the occurrence of a space condition in the transmitting-receiving channel, which causes the release of relay L. This disabling effect is produced by grounding terminal Q' of multivibrator MV–M by reason of the connection of terminal Q' in FIGURE 7B, to terminal Q in FIGURE 7A, which is, in turn, connected to contact 208 of the relay 202.

When the condition of the transmitting-receiving channel is idle and, therefore, in a mark condition, multivibrator MV–M delivers positive driving pulses to the input terminal 214 of the mark counter 138'. In order to provide means for resetting the counters 137' and 138' to zero count in response to a space condition of the line, as described in FIGURE 6, a reset circuit shown in dotted line area 218, in FIGURE 7A, is provided. The reset circuit 218 comprises a transistor $T_{21}$ which, by the action of contact 206 of relay 202 is held biased to cut-off during the mark condition of the channel. Upon the release of the line relay 202 to a space condition, capacitor 220 of the reset circuit begins to charge, and after a time duration of approximately one-third pulse interval, the charge will be sufficient to cause the transistor $T_{21}$ to conduct. Conduction of transistor $T_{21}$ produces a positive reset pulse 221 at output terminal 222 of the reset circuit. Reset pulse 221 is shown to be applied, via circuit path 224 and terminals T—T' (FIGURES 7A and 7B), to the various stages of the space and mark counters 137' and 138' for resetting the circuits to zero count. The same reset signal is also applied via circuit path 224, in FIGURE 7A, through terminals T—T' to the reset terminal R at 226 in FIGURE 7B. Reset terminal R at 226 is associated with the nonprint circuit shown in dotted line area 134'.

The non-print circuit shown in dotted line area 134' is designated as flip-flop FF 8 (R). The application of a positive reset pulse to terminal R of non-print flip-flop FF 8 (R) produces a stable condition in the flip-flop circuit wherein transistor $T_{19}$ thereof is non-conducting and transistor $T_{20}$ is conducting. The designations (N) and (C) associated with the various transistors in the bistable or flip-flop multivibrator circuits shown in this specification indicate states of non-conduction and conduction, respectively, of the associated transistors when the associated multivibrator circuit is in its reset condition. With the non-print flip-flop circuit FF 8 (R) in its reset condition, transistor $T_{19}$ will be non-conducting and the value of the impedance to ground, appearing at terminal A of FF 8 (R), will, therefore, be at its maximum value. Terminal A of non-print flip-flop circuit FF 8 (R) is connected, however, to the output terminal 228 of a mark to space transition detector circuit 148'. Transistor $T_{22}$ of the detector 148' is shown to be normally conducting so that during the idle condition of the receiver the potential at the output terminal 228 of the detector circuit will be at a relatively low value of negative potential. However, when line relay 202 releases to a space condition, the left hand terminal of capacitor 230 will be momentarily grounded over circuit path 232 through terminals P' and P to terminal 207 or contact 207 of line relay 202. This grounding action will cause the base of transistor $T_{22}$ to swing momentarily positive, thereby cutting off the transistor and permitting a negative pulse 234 to appear at output terminal 228 of the transition detector circuit. As will become apparent, this pulse will be of substantial magnitude only if $T_{19}$ of FF 8 (R) is in its non-conducting condition.

Before proceeding further with the description of the receiver depicted in FIGURES 7A and 7B, it will be noted that the space and mark counters 137' and 138', respectively, are each of the binary type and may, in themselves, be considered quite conventional in nature. Space counter 137' comprises three flip-flop circuits, FF 1 (R), FF 2 (R) and FF 3 (R). Each flip-flop circuit is comprised of two transistors connected in a conventional bi-stable multivibrator arrangement to provide a circuit having two conditions of stability. Transistors $T_3$ and $T_4$ are associated with FF 1 (R), transistors $T_5$ and $T_6$ associated with FF 2 (R) and transistors $T_7$ and $T_8$ associated with FF 3 (R). The mark counter 138' is substantially idenical in nature with the space counter 137' except that it comprises four bi-stable flip-flop stages FF 4 (R), FF 5 (R), FF 6 (R) and FF 7 (R). Transistors $T_{11}$, $T_{12}$, $T_{13}$, $T_{14}$, $T_{15}$, $T_{16}$, $T_{17}$ and $T_{18}$ comprise these flip-flop circuits. The symbols (N) and (C) associated with the various transistors in the counter circuit, respectively, correspond to the normal condition of non-conduction or conduction in the transistor. The symbols shown in the counter circuits depict the conditions of the various transistors when the space and mark counters have been reset to zero count, which, of course, in a binary counter corresponds to the maximum count. The three-stage space counter 137' is capable of the maximum count of eight, while the four-stage mark counter 138' is capable of the maximum count of sixteen. The counter conduction schedule illustrated in FIGURE 8 is helpful in analyzing the conditions of the various transistors comprising the space and mark counters for various stages of count. Since the binary counting action of flip-flops FF 1 (R), FF 2 (R), FF 3 (R) is identical to the binary counting action of FF 4 (R), FF 5 (R) and FF 6 (R), the schedule shown in FIGURE 8 is, in part, a combined conduction schedule for the transistors comprising these particular flip-flop circuits. That portion of the schedule, therefore, within dotted line area 236 applies to both the space and mark counters up to the count of eight. This portion of the schedule taken in combination with the remainder of the schedule constitutes a conduction schedule for the mark counter only, which has a maximum count of sixteen.

Associated with each counter is a conventional form of registering matrix, whereby the count of each counter is registered by the appearance of a registering potential at a distinct one of a plurality of registering output terminals. The registering output terminals for the space counter are indicated at 1S, 2S, 3S and 4S with one additional registering output terminal being provided for the count 8S. Likewise, a set of registering output terminals 2M through 8M are provided for the mark counter circuit 138' along with one additional mark registering terminal 10M which is used similarly to the 8S terminal of the space counter, to provide an extra long count detecting means of the character illustrated at 136 in FIGURE 6. That is, whenever the space counter 137' reaches the count of eight, a registering potential will appear at terminal 8S of the space counter. Likewise, whenever the mark counter 138' reaches a count of 10, a registering potential will appear at the output terminal 10M of the mark counter. Both terminals 8S of the space counter and 10M of the mark counter are connected through diodes 238 and 240, respectively, to apply non-print command information to the non-print flip-flop FF 8 (R) at 134'. Therefore, whenever the space of the mark counters reach the count of eight or ten, respectively, the non-print flip-flop circuit FF 8 (R) will be flipped to the condition where transistor $T_{19}$ becomes conducting. This will load down output terminal 228 of the transition detector 148' and keep this terminal from reaching a sufficient negative value to, in turn, allow any substantial value of registering potential to be developed at the registering terminals 1M through 8M of the mark counter. As will be seen hereinafter, this will prevent any function from being actuated.

In accordance with the present invention, a novel form of function selecting matrix is employed for transducing the registering potentials appearing at the space counter registering terminals and mark counter registering terminals into the actuation of various function performing means such as indicated at 244, 246, 248, 250 and 252. By way of example, these function actuating means may comprise electromagnets adapted to move the printing bars of a typewriter in order to produce the printing of written text. The functions 244 through 252 shown are each adapted to become actuated only in response to specific codes, these codes being indicated within the block representing the functions. Thus, it is intended that the function associated with block 244 be performed only if the space and mark intervals of a received coded pulse train are of one unit pulse each—thus, the designation 1S, 1M associated with block 244. Function 246 is designated to be performed only in response to a coded pulse train having a space interval of two unit pulses and a mark interval of one unit pulse, i.e., 2S, 1M; and so on for functions 248 through 252.

To accomplish the selective actuation of the various function performing means, a semi-conductor amplifier device, such as a transistor, is provided for each valid registering terminal of the two counter circuits. Again, the term valid, in this sense, applies only to those specfic values of space and mark unit pulse counts employed to make up a coded pulse train to which a desired or useful function is to be performed. Thus, in the particular arrangement shown in FIGURES 7A and 7B, only space counts of 1S through 4S would be considered valid counts and only mark counts 1M through 8M would be considered valid counts. This proceeds upon the assumption, as hereinabove stipulated, that only a maximum of four unit pulses are to be assigned to the space interval of the code and a maximum unit pulses are to be assigned to the mark interval of the code, thereby providing a thirty-two combination code. If five valid space counts were to be employed and nine valid mark counts were to be employed, the number of combinations would, of course, rise to forty and so forth for other values of maximum count.

Therefore, in the arrangement shown in FIGURES 7A and 7B, transistors 244a, 246a 248a and 250a are associated with the space registering terminals 1S through 4S of the space counter. Eight additional transistors such as transistors 244b, 246b and 250b are in a similar fashion associated with the mark counter registering terminals 1M through 8M, only the three transistors 244b, 246b and 250b being illustrated by way of convenience. In order for a given function such as the function associated with the function actuator 244 to be accomplished, current must pass through this function actuator. Thus, function 244 will be actuated only when a negative potential appears at the registering terminal 1S of the space counter and a negative registering potential appears at terminal 1M of the mark counter. This can only occur when both space and mark counters have counted one unit pulse from their reset condition, and a negative potential appears at the output terminal 228 of the transition detector 148', this negative potential conditionally being in the form of the pulse 234.

*Detailed operation of receiver*

Considering now in more detail the operation of the receiving apparatus depicted in FIGURES 7A and 7B, it will be first assumed that the condition of the channel connected to relay L at 202 is in the idle or mark condition. As described above, in this condition, the relay L will apply a ground to the base of transistor $T_1$ holding the space multivibrator MV-S inoperative. Relay L will also apply a ground to capacitor 220 of the reset circuit 218, the negative bias afforded by the potentiometer connected to the emitter of transistor $T_{21}$ assuring that the transistor will be non-conducting when the ground is applied to capacitor 220. With the relay L operated, transistor $T_{22}$ of the transition detector circuit 148' will be conductive due to the negative battery applied through the resistor directly connected to its base. With the relay L operated in its mark condition, no ground will be applied to the mark multivibrator 143', and this multivibrator will be operative. Each time that transistor $T_{10}$ of MV-M at 143' goes conducting, a positive pulse will be sent through the coupling capacitors associated with terminal 214 of FF 4 (R) causing this flip-flop circuit to change to its opposite condition as is required in typical binary counter circuit action. In the normal reset condition of the counter circuit 138', the even numbered transistor of each flip-flop circuit is conducting. However, during the idle or mark condition, while relay L is operated, the mark counter 138' will be continuously active to count pulses from the mark multivibrator MV-M.

During the continuous counting action of the mark counter 138', while the communication channel is in its idle or mark condition, the mark counter will at some time register the mark of 10. At this particular value of count, the negative potential applied to terminal 270 of the mark counter registering matrix will appear at substantially full value at the 10M registering terminal of the counter. Reference to the counter conduction schedule of FIGURE 8 will show that at this particular value of count none of the counter matrix diodes such as shown at 272, 274, 276 and 278 will be conducting to produce a voltage drop across resistor 280. This negative potential appearing at terminal 10M will then, as described above, be conducted by diode 240, to the IN terminal of the non-print flip-flop FF 8 (R) causing transistor $T_{19}$ to become conducting and thereby establishing a relatively low value of impedance between the output terminal 228 of the transition detector and ground.

Upon the initiation of a space condition defining the first portion of a coded pulse train, in accordance with the present invention, relay L will be released to apply a ground to the left hand terminal of the capacitor 230 in the transition detector 148'. This will momentarily render transistor $T_{22}$ non-conducting, and it will remain non-conducting until capacitor 230 discharges. The time constant of the capacitor 230 and its associated resistors is preferably established at approximately one-third of a unit pulse length so that transistor $T_{22}$ is rendered non-conductive for only one-third of a unit pulse interval. Were it not for the conducting condition of transistor $T_{19}$ in the non-print flip-flop, the voltage at terminal 228 of the transition detector would immediately become a large negative value to define pulse 234 and thereby apply a substantial value of negative potential to terminal 256 of the mark counter registering matrix. However, this negative battery at terminal 256 will not appear in response to the first mark to space transition following a prolonged idle mark condition for the reasons hereinabove set forth involving the action of the non-print flip-flop FF 8 (R).

Simultaneously with the release of relay L, in accordance with the beginning of the space interval, the mark multivibrator MV-M at 143' will be inactivated by reason of the holding ground applied to terminal Q' thereof. Also, the release of the line relay L removed the ground on capacitor 220 of the reset circuit 218, one-third pulse interval after which the charge on capacitor 220 will be sufficiently high to permit transistor $T_{21}$ to conduct, thereby producing a reset pulse at terminal 222 of the reset circuit. As before mentioned, this reset pulse will reset both counter circuits and change the condition of the non-print flip-flop FF 8 (R) to that in which transistor $T_{19}$ thereof is no longer conducting, thereby unloading the output terminal 228 of the transition detector. Finally, the release of the relay L at the beginning of the space interval removes the holding ground on the space multivibrator MV-S at 142'.

As soon as the holding ground is removed from the space multivibrator MV-S, transistor $T_1$ thereof will become conducting, and transistor $T_2$ thereof will go non-conducting which will cause a negative pulse to appear at the collector of the transistor $T_2$. This negative pulse will not be sensed by the counter 137' due to the polarity of the diode 258. However, one-half unit pulse later, the multivibrator MV-S will recycle itself to where $T_1$ becomes non-conducting and $T_2$ becomes conducting. This will result in a positive pulse being applied to the counter 137', thereby stepping it one count. If the space in the line is longer than one unit pulse, the space multivibrator MV-S will continue to operate and at one and one-half unit pulses after the start of the space pulse (which will be at the mid-point of the second unit pulse length of the space), MV-S will flip so that another positive pulse is applied to the counter 137'. If the space in the counter is three units or more in length, the space multivibator MV-S will continue and cause the counter to count to three and then to four, etc. up to eight which is also the zero or reset position of the counter.

It is important at this point to remember that if the space in the line is eight or more unit pulses in length, when the counter does reach step eight, a pulse of negative battery will appear at the 8S terminal of the counter registering terminals. Reference to the counter condition schedule of FIGURE 8 will make this evident, since at the count of eight, none of diodes 260, 262 or 264 will be conducting, the conduction of any one or more of which produces a voltage drop across resistor 266. This negative pulse will then be transmitted from terminal 8S through terminals U and U', and diode 238 to the non-print flip-flop 134' again rendering transistor $T_{19}$ conducting to load down the transition detector circuit 148' and preventing any possible ultimate actuation of a function on the next operation of M-S transition detector 148' which will occur on the next mark to space transition.

Assuming now that the length of the space pulse in the line is only that of one unit pulse, then half a pulse length after the counter has counted step one, and half a pulse length before the counter can count step two, relay L will reoperate to the mark condition. The reoperation of relay L to mark will stop the operation of the space multivibrator MV-S at a time when the space counter is in the condition or step one, which is the condition producing negative battery at the space register terminal 1S. The appearance of this negative potential 1S of the space counter register will forward bias the function selecting matrix transistor 244a. However, since none of the emitter-collector paths of mark function selecting matrix transistors such as 244b, 246b or 250b are conducting, no function will at this time be actuated.

During the mark pulse which has been initiated, the space multivibrator MV-S will remain inoperative and the space counter will remain on "step one" with transistor 244a in the selecting matrix ready to pass collector current. That is, the emitter-base path of transistor 244 will be biased in a forward condition, thereby conditioning the transistor 244 for emitter collector current flow.

When the relay L is actuated to define the end of the space condition, and the beginning of the mark condition, the ground previously appearing on the base of transistor $T_9$ of the mark multivibrator circuit 143' will be removed, and the multivibrator will immediately find itself in the condition of transistor $T_{10}$ non-conducting and transistor $T_9$ conducting, thereby producing a negative conditions at the output of the multivibrator which is suppressed by the diode coupling the multivibrator to flip-flop FF 4 (R). For the next half cycle of its operation, the mark multivibrator MV–M will return to its normal condition causing a positive pulse to be sent through the coupling diode connected to the mark multivibrator and driving the mark counter 138' to register one count. As in the space counter action, as long as the mark condition lasts, the mark multivibrator will continue to operate and send a positive pulse to the counter at the midpoint of each unit length of pulse by which the mark pulse increases. Assuming that the length of the mark pulse is that of one unit pulse, then, at the end of one unit length of mark condition, half a unit pulse after the counter has been set to step one, the relay L will be operated by the line to the spacing condition. The ground then applied to the mark multivibrator will cause it to stop operation. However, the M–S transition detector 148' will detect the mark to space transition which defines the end of mark pulse just measured, and since the non-print flip-flop 8 has not been flipped to its print disabling condition, the negative pulse 234 will appear at the output terminal 228 of the transition detector 148'. Since the mark counter 138' has been stepped to only the count of one, this negative pulse indicated at 234 will appear only at the register output terminal 1M of the mark counter and hence, apply forward emitter base bias on the function selector matrix transistor 244b. At this time, emitter collector current flow through both transistors 244a and 244b will cause actuation of the function actuator 244. Likewise, if the duration of the space pulse had been two unit pulse lengths while the duration of the mark pulse had been only one unit pulse length, the actuation of the actuator 246 would have occurred instead.

The unique feature of the present invention will immediately become apparent in that while measurement of alternate mark and space conditions which define coding information is accurately accomplished, any space or mark pulse of abnormal or non-valid length, such as do not occur in regularly assigned code signals, cause no function or printing action. Since the actual energization of the specific function actuator occurs during the period from the end of the mark pulse to one-third the length of the first unit pulse of the following space condition, storage capacitors such as shown in the drawings may be shunted around each of the function actuators. These capacitors will charge during the time the two associated space and mark transistors are conducting and will hold the function actuator operated for a period of time after the matrix transistors go non-conducting.

It is also to be noted that an important feature of the present invention resides in the fact that the sending of a counting pulse to either of the counters occurs at the midpoint of each unit pulse length. Consider the case where a single mark pulse is received. The length of the mark pulse would have to be decreased by half unit pulse before no count would be sent to the counter or be increased by half a unit pulse before two counts would be registered. The same half a unit pulse margin applies to all lengths of pulses. In the case of an incoming pulse three unit pulses in length, the counter multivibrators would send their third counting pulse to the counter actually at the time the length of the incoming pulse was 2.5 units in length. The fourth count pulse would not be sent until the incoming pulse reached 3.5 units in length. Thus, the nominal three-unit pulse would have to be shortened to a length of 2.5 units before the count circuit would receive only two counts or would have to be lengthened to 3.5 unit pulses before the count circuit would receive four counts. The margin of operation for proper counting of the unit pulses in a received signal is, therefore, plus or minus one-half a unit pulse. This greatly increases the noise immunity of the over all transmission and receiving ability of the system.

It is further apparent from an understanding of the present invention that should it be desired to reduce the required band width of the associated signal communication channel to successfully transmit and receive coded pulse trains in accordance with the present invention, it is necessary only to discard all those combinations of code in which the space or the mark pulse is of unit pulse length and replace them with longer combinations not presently in use.

As is well known, the band width required to transmit a pulse is inversely proportional to the length of the pulse. Therefore, if all codes in which a unit space or mark pulse appears are discarded, all pulses of unit length will be eliminated and the minimum length of pulse that would be used would be the length of two unit pulses. Therefore, the band width required for transmission of the code would become only half that required when the minimum pulse transmitted is a unit pulse in length. Considering the use of space pulses and mark pulses up to 8 unit pulses in length, which provides for eight times eight, or sixty-four codes, eight of these codes have a space pulse of unit length and eight have a mark pulse of unit length, there being a total of seventeen codes having one or both pulses of unit length. If these seventeen codes are discarded, there are left a total of forty-seven codes out of the maximum of sixty-four that are available. The usual typewriter has only about forty-three different functions; therefore, it is possible to provide enough codes for typewriter operation on the basis of using no codes in which the minimum pulse is only one unit pulse in length.

Another arrangement of this system is to make the minimum length of pulse say the length of one and one-half unit pulses, thereby decreasing the band width required to sixty-seven percent of that required when the minimum pulse is one unit in length. The remaining increments of pulse elongations would be on a unit basis or unit difference between pulse lengths.

Both of the above plans do not decrease the required band width the complete amount indicated by the decrease in length of the minimum pulse, if the speed of transmission of intelligence is to remain the same, for the reason that the average length of code will be increased by the discarding of the codes in which the minimum pulse length is one unit and the replacing of these codes with the longer code combinations previously not used if only a total of forty-three codes were required. This effect reduces the speed of transmission of information and if the speed is increased to compensate for the effect, the required band width will be increased. The net effect, however, is that less band width is required by eliminating the unit pulse codes and speeding up transmission slightly and, therefore, an economic saving is possible with this feature.

A further reduction in required band width is possible when the functions to be coded and transmitted do not all occur with equal frequency. In this case, the codes are assigned to the functions on the basis of assigning the shortest code (one unit space and one unit mark, or two of each if the previously described system for reducing the band width is being used) and thereafter assigning the remaining codes on the basis of the functions with the greatest frequency of occurrence being given the shortest available code. Thus, in the English language, the letter "E" occurs most frequently, followed by "T"

and so on. In the case of typewriter operation, the space function for separating words occurs more frequently than the letter "E." There the shortest code would be assigned to the space function, the next longest code to the letter "E" and so on, with the longest codes being assigned to "Z," "X," etc.

As another example, where it is required to transmit information on the value of a quantity and the occurrence of the values is such that the low ones occur more frequently than the higher ones, a saving in band width is obtained if the shorter codes are assigned to the lower values of the quantity. That is, in accordance with the present invention, the length of the coded pulse train assigned to any character or function is substantially inversely proportional to the frequency with which the character or function appears in a typical average transmission period.

*Alternative transmitter-receiver arrangement*

The specific forms of transmitter and receiver arrangements discussed above have been based, in the most part, upon the use of a two-condition coded pulse train defined by a space condition of predetermined time duration followed by a mark condition of predetermined time duration. This was discussed and illustrated in connection with FIGURE 2 of the drawings. Reference to FIGURE 2 and the descriptive matter of this specification, beginning on page 12 hereof, makes clear that where the sequence of the two intervals defining the coded pulse train of the present invention is space, then mark, it is desirable to send a dummy or non-print function at the end of the message in order that the last meaningful function or character of the message be printed or carried out. This follows from the fact that the receiver apparatus, constructed in accordance with that form of the present invention illustrated generally in FIGURE 3 and FIGURE 6, the actual printing of a character is carried out only in response to a mark to space transition of the communication channel. Such transitions are indicated in FIGURE 2 as occurring at times corresponding to arrows 34, 35, 36 and 37.

In a preferred form of the present invention, however, the printing of a character, or actuation of a function, may be conditioned upon the transition, in the communication channel, from a space condition to a mark condition. In such an arrangement, the two-conditioned coded pulse train of the present invention which defines a given character or function will be made up of a mark condition followed by a space condition. This arrangement obviates the need for sending a dummy character at the end of a message. Instead of the requirement for a dummy character at the end of the message (or more accurately a space condition followed by a mark condition either or both of non-valid length, as shown in FIGURE 2), all that is necessary in this alternative form of the present invention is to transmit a space condition just prior to sending a message.

More specifically, referring to FIGURE 2, in this alternative form of the present invention, instead of intervals 24 and 25 constituting the first coded pulse train, in the alternative form of the present invention, intervals 25 and 26 will comprise the first coded pulse train. Intervals 25 and 26, therefore, will define the first character or function being transmitted. This first character will be printed at time $T_5$, indicated by arrow 300. As inspection will show, at time $T_5$, a transition is made, in the communication channel, from a space condition to a mark condition. Following the first coded pulse train 25—26, the second coded pulse train is defined by intervals 27 and 28. This second character is printed in response to the space to mark transition occurring at time $T_7$ indicated by arrow 302. Following this general scheme of coded intervals, it can be seen that the last meaningful character of the message will be defined by a coded pulse train whose termination is defined by a space to mark condition of the channel, and, thus, the channel will be put and remain in its normally idle mark condition immediately following the transition of the last meaningful character.

Still referring to FIGURE 2 in the light of the above-alternate form of coded pulse train, it will become immediately evident that since the printing of a function of the receiver must correspond to a space to mark transition, the first coded pulse train of a given transmission must be preceded by a space condition in the transmission channel in order to discretely define the duration of the first mark interval of a given coded pulse train. Thus, in FIGURE 2, the space interval 24 may comprise this required space condition so that the first character printed will correspond to a coded pulse train whose first interval 25 is a mark of one unit pulse length duration, and whose second interval 26 is a space condition of two unit pulse lengths duration. All, then, that is required to modify the transmitter and receiver systems of FIGURES 3 and 6 (specific forms of which are shown in FIGURES 5, 7A and 7B), to operate in accordance with this alternative form of coded pulse train, is to provide means in the transmitter for transmitting a "blind" space just prior to the transmission of a message. In accordance with this, means are provided in the receiver for actuating the printing of a character upon a space to mark transition rather than a mark to space transition as provided for in the arrangements previously discussed.

A suitable modification of the transmitter and receiving arrangements, shown in FIGURE 5 and FIGURES 7A and 7B, respectively, to carry out this alternative form of the present invention, is indicated in FIGURE 9 and FIGURE 10, respectively. The transmitter arrangement in FIGURE 9 is substantially identical to that shown in FIGURE 5 except for minor modifications which will be here described. The general operation of the transmitter arrangements of FIGURE 5 and FIGURE 9 are substantially identical with the exception that in the arrangement of FIGURE 9 means are provided for sending a blind space prior to the beginning of a message. Circuit elements, in the arrangement shown in FIGURE 9, which are identical to circuit elements in the arrangement shown in FIGURE 5 have been given corresponding drawing reference numerals.

In the transmitter arrangement of FIGURE 9, however, a relay SU, at 304, has been added and diodes 306 and 308 have been added. It is the purpose of relay SU at 304 (which is a slow acting relay), to control the initial operation of the tape-step magnet 115, previously described. Thus, the normally open contacts of relay SU are imposed at 310 between the source of negative potential 312 and the tape step magnet 115. Accordingly, as long as relay SU, at 304, is inactivated, tape step magnet 115 cannot be activated. The actuation of relay SU, at 304, is, in turn, conditioned upon the closing of the start relay ST, at 107, by reason of additional normally-open back contacts $ST_8$, shown at 314. Another additional set of back contacts on relay ST, at 107, are shown as $ST_9$, at 316. Relay contacts $ST_9$ at 316, are shown in conditional shunting relationship to a new resistor 320 connected to a source of negative potential, at 322. A new capacitor 324 has been added to couple the resistor 320 to the new diodes 306 and 308 mentioned above. A resistor 326 provides a charge-discharge path for the capacitor 324 from the negative potential appearing at terminal 322.

One last modification of the arrangement shown in FIGURE 5 and illustrated in FIGURE 9 is that of coupling the right-hand terminal of capacitor 120 (which drives the tape step magnet amplifier transistor $T_{13}$ from flip-flop FF 5 (T) to terminal B of flip-flop FF 5 (T) in the arrangement of FIGURE 8, rather than terminal A of flip-flop FF 5 (T) as previously shown in FIGURE 5.

In the operation of the transmitter arrangement, shown in FIGURE 9, it will be assumed that tape has been inserted in the tape-sending unit, so that the sixth pin contact 106 is closed. Closing of the manual start switch 108 will then actuate relay ST and cause the back contacts $ST_9$ at 316 to close. Since, prior to this time, the capacitor 324 has charged through resistor 320 and 326, a positive-going pulse will be applied through diodes 306 and 308 to flip-flops FF 1 and FF 2. Simultaneously, with the closing of the relay ST, flip-flop FF 5 (T) will be flipped, as before, to apply a space-timing set signal to flip-flops FF 3 (T) and FF 4 (T) in the usual manner. The counter 113 will, therefore, be set on step 15 and can count only one pulse from the timing signal source 114 at the end of which flip-flop FF 5 (T) will be recycled, as before. Thus, closing of the manual start switch 108 will cause a space condition of one unit pulse length duration on the transmitting lines 110. It will be noted that flip-flop FF 1 (T) and flip-flop FF 2 (T) will always be flipped in this initial start condition, regardless of whether or not there are holes in the punched tape corresponding to perforation sensing pin contacts 101 and 102.

The base of transistor $T_{13}$ which drives the tape step magnet 115 now receiving the negative-going pulse delivered at terminal B at flip-flop FF 5 (T) causes the step magnet to operate on mark to space transitions rather than space to mark conditions. However, the tape step magnet 115 does not operate on the first mark to space transition which defines the beginning of the blind space pulse just described because of the slow action of relay SU, at 304, this relay having been energized by the back contacts $ST_9$ of relay ST.

Thus, to summarize, the first action that occurs in the operation of the transmitter of FIGURE 9 is that of the sending of a unit space pulse to the line 110. This action is independent of the presence or lack of holes in the sending tape for positions one and two thereof for a five pulse code tape, or positions one, two and three for a six pulse code tape. The tape does not step at the end of this first space pulse because of the slow action of relay 304. The following mark signal depends upon the holes in positions 3, 4 and 5 of the perforated tape which are sensed by sensing pin contacts 103, 104 and 105, as in the arrangement of FIGURE 5. The tape is actually stepped at the beginning of the first meaningful space pulse (mark to space transition), but, as before, the tape stepping magnet is slow enough in its operation to permit the holes on the perforated tape, at positions 1 and 2 thereof (corresponding to perforation sensing pin contacts 101 and 102) to set the counter before the tape actually moves.

The only necessary modification of the receiver arrangement, shown in FIGURES 7A and 7B, is that of providing means for causing the transition detector 148', in FIGURE 7B, to apply a pulse to the print solenoid matrix only upon space to mark transitions of the line, rather than mark to space transitions, as before. This may be easily carried out by modifying the contact arrangement of the line relay, L, at 202, in FIGURE 7A, (upper left-hand corner).

This modification is shown in FIGURE 10. Here the input terminal 232 of the transition detector 148', of FIGURE 7B, is shown connected to a new contact 330 instead of contact 208, as shown in FIGURE 7A. The transition detector 148' will then operate in exactly the same manner as described above, except that it will withhold power from the print solenoid control matrices until a space to mark transition occurs. It will be noted that the first space to mark transition occurring at the end of the blind space pulse will not cause a printing actuation in the receiver, since, as described above, the non-print flip-flop FF 8 (R) at 134', in FIGURE 7B, will have been actuated by reason of the extended mark condition defined by the idle condition of the line prior to sending the first blind space pulse.

*Receiver with binary pulse data output*

It will be understood that the novel coded pulse train communication system afforded by the present invention is in no way limited to the specific forms of transmitter and receiver arrangements employed to produce and transduce the two-condition coded pulse train characterizing the present invention. For example, instead of a receiving system of the general form illustrated in FIGURES 6, 7A and 7B, in which matrix techniques are employed to analyze the unit pulse counts registered by the space and mark counter means, a receiver of the type illustrated in FIGURE 11 is sometimes preferable.

In the arrangement of FIGURE 11, the received two-condition coded pulse train of the present invention is transduced into multi-bit binary code information suitable for actuating certain well known forms of transducing machines, typical of which is the popular "Flexo Writer Code Translator" presently manufactured by the Friden Corporation. The Flexo Writer Code Translator is a form of electrically controllable typewriter which is responsive to six-bit binary information to convert this information into individual typing functions or printed characters. This code translator comprises means for mechanically selecting and operating key levers of the Flexo Writer typewriter mechanism in response to electrical impulses. The code translator includes a bar solenoid for each bit of the binary code supplied to it, plus a bail-actuating solenoid for operating a single revolution mechanical clutch. Each bar solenoid controls the position of one of six bars, there being one bar for each bit of the binary information supplied to the Flexo Writer Code Translator. As soon as all of the bar-actuating solenoids have been appropriately energized by binary information, the bail actuating solenoid is activated. The bail actuating solenoid releases a single revolution mechanical clutch which, in turn, permits a bail to mechanically move an operating key lever of the Flexo Writer. The operating key lever of the Flexo Writer which is moved is, in turn, selected by, or determined by the alignment of notches in the various bars whose position is controlled by the bar-actuating solenoids.

In the arrangement illustrated in FIGURE 11, the Flexo Writer Code Translator typewriter apparatus is indicated generally at 350. Input terminals $S_1$, $S_2$, $S_3$, $S_4$, $S_5$ and $S_6$, respectively, correspond to the input terminals of the six bar actuating solenoids of the Flexo Writer. Input terminal 352, of the Flexo Writer, corresponds to the input of the bail actuating solenoid. Whenever a bail actuating signal is applied to the terminal 352 of the Flexo Writer, one of sixty-four characters or functions will be printed or actuated. The particular character or function which will be printed or actuated, upon the occurrence of a bail actuating signal, will depend upon the particular bar-actuating solenoids which are activated at the time the bail actuating signal occurs.

The novel two-condition coded pulse train, of the present invention, may be easily transduced by a receiver system of the character shown in FIGURE 11 to apply binary bar-actuating signals and bail actuating signals to the Flexo Writer 350.

It will be apparent that in order to take full advantage of the six-bit potential of the Flexo Writer Code Translator 350, in FIGURE 11, six-bit binary code information must be translated at the transmitting terminal into the two-condition coded pulse train of the present invention. Or, means must be provided at the transmitting terminal of the system to cause the coded pulse train of the present invention to represent six-bit binary code data. To this end, the general form of sending arrangement, shown in FIGURE 3, need be modified only to the extent of providing a tape-sending unit capable of handling six-bit perforator tape. Thus, the five-bit perforated tape, shown in FIGURE 4, having five possible coding perforations per step, would be replaced by a perforated tape having six coding perforations per step. The perforation sensing means 53, in FIGURE 3, would then be made responsive to the conditional presence or absence of six coding tape perforations per step so that three of the possible six coding perforations would control the fast acting mark counter set circuit 58, and the other three perforations, the fast acting space counter 59, in FIGURE 3. The resulting two-condition coded pulse train, of the present invention, would then be defined by a space condition having a maximum duration of eight unit pulses and a mark condition having a maximum duration of eight unit pulses. Correspondingly, the receiver arrangement of FIGURE 11 may be substantially the same as shown in FIGURE 6 in that space and mark counters are caused to register the respective durations of space and mark intervals in the coded pulse train. In contrast to the specific receiving arrangements shown in FIGURES 7A and 7B, however, it is desired that both the space and mark counter circuits, in the arrangement of FIGURE 11, be capable of counting up to at least 9 unit pulses. Thus, the space counter circuit of FIGURE 11 comprises flip-flops FF 1, FF 2, FF 3 and FF 4, while the mark counter circuit comprises flip-flops FF 5, FF 6, FF 7 and FF 8. As far as the control of the space and mark counters in FIGURE 11 is concerned, this is carried out in exactly the same fashion as described in connection with the receiving arrangement of FIGURES 7A and 7B.

More specifically, in the arrangement of FIGURE 11, the space counting circuit comprising flip-flops FF 1, FF 2, FF 3 and FF 4 is controlled by a space multivibrator 354 corresponding to the multivibrator MV–S at 142' in FIGURE 7A. The mark counter of FIGURE 11 comprising flip-flops FF 5, FF 6, FF 7 and FF 8 are, in turn, controlled or driven by a mark multivibrator MV–M at 356, corresponding to multivibrator MV–M at 143' in FIGURE 7B. Disabling means 358 and 360, respectively, controlled by mark and space conditions detected by the channel condition transducer 362, are provided in accordance with the arrangement shown in FIGURES 7A and 7B. A reset means 364 is likewise provided for resetting the flip-flops of both the space and mark counters and the non-print flip-flop 366 shortly after the first mark to space transition on the communication channel. Delay means 368 appropriately delays this reset action as described above in connection with FIGURES 7A and 7B. A mark to space transition detector 370 is provided for applying an operating pulse to the bail actuating solenoids and bar-actuating solenoids of the Flexo Writer at the time it is desired the Flexo Writer to print. The gate 372, controlled by the non-print flip-flop 366, prevents the actuating signal from the mark to space transition detector from reaching the Flexo Writer, if either a mark or space condition on the communication channel persists for more than 8 unit pulses in duration. Output signals from either flip-flop FF 4 or flip-flop FF 8 is indicative of this extra long pulse condition and apply an appropriate signal to an extra long pulse amplifier 374, whenever an extra long pulse condition occurs. Signal from the extra long pulse amplifier operates to flip the non-print flip-flop 366 to prevent an operating signal from being applied to the Flexo Writer bail and bar-actuating solenoids in exactly the same manner as described above in connection with the embodiments shown in FIGURES 6, 7A and 7B.

In the operation of the arrangement shown in FIGURE 11, incoming two-condition coded pulses train signals are analyzed by the channel condition transducer 362 to cause respective registering of their durations on the space and mark counters above described. At the end of each valid coded pulse train, the mark to space transition detector 370 will apply an operating signal over line 376 to the armatures of relays $P_1$, $P_2$, $P_3$, $P_4$, $P_5$ and $P_6$ as well as the bail actuating terminal 352. Each of the relays $P_1$, $P_2$, $P_3$, $P_4$, $P_5$ and $P_6$ is, respectively, controlled by the condition of the output of its associated flip-flop circuit. Relays $P_1$, $P_2$ and $P_3$, respectively, respond to the conditions of flip-flops FF 1, FF 2 and FF 3, while relays $P_4$, $P_5$ and $P_6$, respectively, respond to the conditions of flip-flops FF 5, FF 6 and FF 7. Thus, at the end of a given coded pulse train, the various conditions of actuation in the relays $P_1$, $P_2$, $P_3$, $P_4$, $P_5$ and $P_6$ will depict one of sixty-four possible combinations of the conditions of these relays. Since the operating contact on each of the relays $P_1$, $P_2$, $P_3$, $P_4$, $P_5$ and $P_6$ is, respectively, connected to a corresponding bar-actuating solenoid of the Flexo Writer, the Flexo Writer will, in turn, be conditioned to print or actuate one of sixty-four possible characters or functions. Since the operation of each of relays $P_1$, $P_2$, $P_3$, $P_4$, $P_5$ and $P_6$ is relatively fast with respect to the effective speed of the bail actuating solenoid, and the actuation of the bar-actuation solenoid is faster than the bail actuating solenoid, the "set up" of the Flexo Writer will occur prior to the operation of the mechanical bail within it.

As brought out hereinabove, should either of the two conditions of the channel persist for more than eight unit pulses, flip-flops FF 4 and FF 8 will cause an extra long pulse indication to be applied to the amplifier 374 which, in turn, will cause the non-print flip-flop 366 to flip and prevent a mark to space transition signal from reaching either the bail actuating solenoid or the bar actuating solenoid through the armatures of relays $P_1$, $P_2$, $P_3$, $P_4$, $P_5$ and $P_6$, hence the Flexo Writer will not print or actuate a non-valid (erroneous) character or function.

From the above, it will be apparent that the present invention provides a novel form of coded pulse train communication system which affords all of the advantages hereinabove set forth and yet is easily embodied in a variety of system arrangements which are relatively simple and inexpensive.

I claim:

1. In a pulse code communication system suitable for use in printing telegraph communication in which a sending station is connected by a communication channel to a receiving station, the combination of: condition changing means adapted to be located at the sending station for selectively producing either one of two alternate conditions in the channel connecting the sending station with a receiving station; means operatively coupled with said condition changing means for changing the condition of said channel in accordance with a selected one of a plurality of different functions it is desired be performed at a receiving station to produce a pair of time contiguous alternate channel conditions, the time durations of each of the individual alternate channel conditions defining said pair, when taken in combination, completely defining said selected function it is desired be performed at a receiving station; means adapted to be located at a receiving station for measuring the time duration of each individual channel condition making up a pair of time contiguous alternate channel conditions; and means adapted to be located at said receiving station responsive to said time-measuring means for selectively executing said selected one of a plurality of different functions, in accordance with the relative time durations of the individual alternate channel conditions defining said given pair of alternate channel conditions.

2. A pulse code communication system, in accordance with claim 1, in which additional means are provided at the receiving station responsive to the specific transition of the communciation channel from one condition to another condition for controlling the exact time in which a given function is executed at said receiving station.

3. In a pulse code communication system, the combination of: a sending station coupled to a receiving station over a channel whose normal idle condition may be termed a mark condition; means located at said sending station for controllably changing the condition of said channel from a mark condition to an alternate condition which may be termed a space condition; means operatively connected with said condition changing means for producing individual pairs of time contiguous space and mark conditions in said channel; means included in said last named means for controlling the duration of the space and the mark conditions making up any given one of said pairs, respectively, in accordance with one of a plurality of specific functions it is desired be performed at said receiving station such that any specific desired function is completely defined by a specific time duration relationship between a pair of space and mark conditions; and means located at said receiving station responsive to alternate conditions of space and mark to perform each desired function in response to the transition of said communciation channel from one condition to the alternate condition.

4. In a coded pulse train communication system, the combination of: program means for storing information depicting a variety of functions it is desired be performed at a receiving station; means responsive to said program means for developing a different two-condition coded pulse train for each different function it is desired be performed at the receiving station, the majority of said two-condition coded pulse trains developed each comprising two succesive alternate conditions of a communication channel with the first condition being distinguishably different from the second condition; and means included in said last named means for controlling time duration of each of said first and second conditions comprising a given coded pulse train, in accordance with the program information.

5. In a coded pulse train communication system in which discrete elements of information to be transmitted over a communication channel from a sending station to a receiving station; means for controlling the condition of the communication channel between a first condition and a second condition; means coupled with said condition controlling means for causing said channel condition to alternately change from said first condition to said second condition to develop in said channel a series of two-condition pulse trains, each pulse train being represented by an interval corresponding to said first condition and an interval defined by said second condition; and means for controlling the time duration of each interval in each pair of intervals comprising a given pulse train so that the combination of the time durations of the pair of intervals constituting a given pulse train represents a specific element of information to be transmitted to the receiving station.

6. Apparatus according to claim 5 wherein means are included in said time duration controlling means for establishing the time duration of each of the intervals comprising any pulse train as an integral multiple of a basic time reference interval of predetermined fixed duration.

7. Apparatus according to claim 5 wherein said time duration controlling means comprises a binary data storage apparatus in which is stored for conditional read-out, two sets of binary data for each element of information to be transmitted to the receiving station; and means for reading out said stored binary data in controlling relation to the timing of the intervals constituting a given pulse train so that the time duration of each interval comprising a given pulse train conforms respectively to different one of said two sets of binary data.

8. Apparatus according to claim 7 wherein said means for reading out said binary data includes a single resettable binary counter; means for sensing the condition of said counter corresponding to full count thereof for both changing the condition of said communication channel and changing the data read-out by said read-out means; means for resetting said counter in accordance with said sets of stored binary data upon the condition of full count in said counter; and means for controllably stepping said counter at a predetermined rate corresponding to a basic time reference interval of predetermined fixed duration.

9. Apparatus for transducing stored binary data representing elements of information into two condition pulse trains comprising: means for conditionally reading out stored binary data representing a plurality of information elements, each information element being represented in terms of the combined and relative durations of two successive intervals such that each discretely different information element is depicted by a different combination of the timing duration of a pair of intervals, each interval being, in turn, timed in response to a different set of stored binary data; means for controlling the read out of said read-out means on a step-by-step basis to permit successive read out of binary data representing a succession of information elements; a binary counter coupled in driven relation to a source of recurrent pulses; means for resetting said counter at predetermined values of count in response to the binary data read out by said read-out means; and means responsive to the full count condition of said counter for actuating said read-out controlling means to step said read-out means so that three successive full count conditions of said counter defines a pair of timed intervals depicting a given element of information.

10. In a coded pulse train communication system wherein a combination of a plurality of discretely different elements of information of predetermined character are to be transmitted to a receiving station over a communication channel, the combination of: means for establishing the condition of the communication channel in either a first condition representing the normal or idle condition of the channel or a second condition representing a distinguishably different condition of the channel from said first condition; means coupled with said condition establishing means for producing a series of two condition pulse trains in said channel, each pulse train being defined by a first interval during which said channel is established in said first condition followed by a second interval during which said channel is established in said second condition; means operative to control the time durations of the said first and second intervals comprising a given pulse train so that the relative and actual timing thereof, taken in combination, identifies a discrete element of information to be transmitted to the receiving station; and means coupled with said channel condition establishing means for establishing said channel in said second condition for an interval just prior to and contiguous with transmission of pulse trains representing said different elements of information.

11. In a coded pulse train communication system wherein a combination of a plurality of discretely different elements of information, each of a predetermined character, are to be transmitted to a receiving station over a communication channel, the combination of: means for establishing the condition of the communication channel in either a first condition representing the normal or idle condition of the channel or a second condition representing a distinguishably different condition of the channel from said first condition; means coupled with said condition establishing means for producing a series of two-condition pulse trains in said channel, each pulse train being defined by a first interval during which said channel is established in said second condition followed by a second interval during which said channel is established in said first condition; and means operative to control the time durations of the said first and second intervals comprising a given pulse train so that the relative and actual timing thereof, taken in combination, identifies a discrete element of information to be transmitted to the receiving station.

12. In a coded pulse train communication system in which each discrete element of information is transmitted to a receiving station by means of a corresponding two-condition coded pulse train, with each pulse train being defined by a pair of alternate conditions of the communication channel serving the receiver, the time duration of the intervals defined by each of the two conditions comprising a given pulse train, when taken in combination, completely defining a specific element of information, a receiving system comprising in combination: means adapted to be coupled to the communication channel serving said receiver for indicating the condition of said channel; a first and a second resettable time measuring means; means responsive to the condition of said channel for actuating said first time-measuring means only in response to and during one condition of said channel while actuating said second time-measuring means only in response to and during the other condition of said channel; means coupled with said time-measuring means for effectively reading the times measured by both said time-measuring means at a time defined by the transition of channel conditions defining the end of the last interval comprising a coded pulse train; means responsive to the times effectively read from said time-measuring means for developing signal information specifically representing the element of information corresponding to the coded pulse train the durations of whose pair of intervals have been effectively measured; and means for resetting both of said counters in response to that sequence of change in the condition of said channel which defines the end of a coded pulse train.

13. Apparatus according to claim 12 wherein means are provided for delaying the actuation of said time-measuring means for a first predetermined period of time following the beginning of either condition in said channel and means for delaying the actuation of said resetting means for a second predetermined period of time following said transition in channel conditions defining the end of a coded pulse train, with the value of second period of delay time being less than said first period of delay time.

14. In a coded pulse train communication system in which a plurality of predetermined elements of information are to be sequentially transmitted, one at a time over a communication channel, to a receiving location, by means of two-condition coded pulse trains, with each coded pulse train being defined by a pair of alternate conditions in said channel, the time duration of each interval during which each of the alternate conditions defining a given pulse train persists, being an integral multiple of a basic time reference interval, with the exact and relative durations of the intervals defining a given pulse train, when taken in combination, defining a specific one of said predetermined elements of information, a receiver arrangement for decoding said coded pulse trains into signal information identifying said predetermined elements of information, comprising in combination: a first and a second resettable pulse responsive counters, each having count registering means and each coupled in driven relation to a source of periodically recurrent pulses having a period of recurrence substantially corresponding to the basic time reference interval upon which the two-condition coded pulse trains are based; means responsive to the alternate conditions of the communication channel for effectively enabling said first counter only during intervals in which the channel is in the first one of said alternate conditions; means responsive to the alternate conditions of the communication channel for effectively enabling said second counter only during intervals in which the channel is in the second one of said alternate conditions; and means responsive to those transitions in said channel defining the ends of the second intervals of coded pulse trains for sensing the count registered by each counter and resetting said counters.

15. Apparatus according to claim 14 wherein means are provided for delaying the enablement of said first and second counters, with respect to the actual transitions in channel conditions attending the respective beginnings of said alternate channel conditions, by a value of time delay substantially equal to one-half the value of said basic time reference interval; and means for delaying the resetting of said counters, with respect to transitions in channel conditions defining the ends of the second intervals defining coded pulse trains, by a value of time delay less than one-half the value of said basic time reference interval.

16. In a coded pulse train communication system in which a plurality of predetermined elements of information are to be sequentially transmitted, one at a time over a communication channel, to a receiving location, by means of two-condition coded pulse trains, with each coded pulse train being defined by a pair of alternate conditions in said channel, the time duration of each interval during which each of the alternate conditions defining a given pulse train persists, being an integral multiple of a basic time reference interval, with the exact and relative durations of the intervals defining a given pulse train, when taken in combination, defining a specific one of said predetermined elements of information, a receiver arrangement for decoding said coded pulse trains into signal information identifying said predetermined elements of information, comprising in combination: a first and a second resettable pulse responsive counters, each having count registering means and each coupled in driven relation to a source of periodically recurrent pulses having a period of recurrence substantially corresponding to the basic time reference interval upon which the two-condition coded pulse trains are based; means responsive to the alternate conditions of the communication channel for effectively enabling said first counter only during intervals in which the channel is in the first one of said alternate conditions; means responsive to the alternate conditions of the communication channel for effectively enabling said second counter only during intervals in which the channel is in the second one of said alternate conditions; a plurality of function actuation devices for selective operation of predetermined functions in accordance with the specific character of information depicted by an element of information; means responsive to the counts registered by both counters, taken in combination, to selectively condition an actuation device for operation; and means responsive to those transistions in said channel defining the ends of the second intervals of coded pulse trains for withholding actuation of any function until the occurrence of the end of the second interval of the coded pulse train, the interval durations of which have been registered by said counters.

17. In a coded pulse train communication system in which a plurality of predetermined elements of information are to be sequentially transmitted, one at a time over a communication channel, to a receiving location, by means of two-condition coded pulse trains, with each coded pulse train being defined by a pair of alternate conditions in said channel, the time duration of each interval during which each of the alternate conditions defining a given pulse train persists, being an integral multiple of a basic time reference interval, with the exact and relative durations of the intervals defining a given pulse train, when taken in combination, defining a specific one of said predetermined elements of information, all of said predetermined elements of information being assigned coded pulse trains, the durations of alternate intervals of which do not exceed respective predetermined maximum integral multiples of said basic time reference interval, a receiver arrangement for decoding said coded pulse trains into signal information identifying said predetermined elements of information, comprising in combination: a first and a second resettable pulse responsive counters, each having count registering means and each coupled in driven relation to a source of periodically recurrent pulses having a period of recurrence substantially corresponding to the basic time reference interval upon which the two-condition coded pulse trains are based; means responsive to the alternate conditions of the communication channel for effectively enabling said first counter only during intervals in which the channel is in the first one of said alternate conditions; means responsive to the alternate conditions of the communication channel for effectively enabling said second counter only during intervals in which the channel is in the second one of said alternate conditions; a plurality of function actuation devices for selective operation of predetermined functions in accordance with the specific character of information depicted by an element of information; means responsive to the counts registered by both counters, taken in combination, to selectively condition an actuation device for operation; means responsive to those transitions in said channel defining the ends of the second intervals of coded pulse trains for withholding actuation of any function until the occurrence of the end of the second interval of the coded pulse train, the interval durations of which have been registered by said counters; and means responsive to a count registered by either of said counters the value of which is in excess of the respective predetermined maximum integral multiple of said basic time reference interval assigned the channel condition associated with the respective counter registering the excess count, for preventing the actuation of any of said function actuation devices until the occurrence of successive intervals of alternate channel conditions of durations corresponding to one of said predetermined elements of information.

18. In a coded pulse train communication system in which a plurality of predetermined elements of function performing information are to be sequentially transmitted, one at a time, on a contiguous basis over a communication channel to a receiving location by means of two-condition coded pulse trains, each coded pulse train being defined by a pair of alternate conditions in said channel the time duration of each interval during which each of the alternate conditions defining a given pulse train persists, when taken in combination, defining a specific function to be performed at the receiving location, a receiver apparatus comprising: a plurality of function performing means designated for selective actuation each in accordance with a coded pulse train bearing a specific time duration relationship between the intervals defining said train; means responsive to the time durations of those successive alternate conditions in said channel which comprise a coded pulse train to selectively condition one of said function performing means for actuation; and means responsive to the conditions of said channel for sensing those transitions in the condition of said channel which define the beginning of the first interval of a coded pulse train for actuating the function performing means selectively conditioned by the coded pulse train immediately preceding said coded pulse train the beginning of whose first interval is sensed.

19. Apparatus according to claim 18 wherein said function performing means comprises a Flexo Writer type binary code transducing electrically operated typewriter having a plurality of function selecting magnets and a printing actuating magnet and wherein said means for selectively conditioning a function performing means comprises a first and a second binary counter each connected to register the time durations of respectively different channel conditions, said counters each including count registering means adapted to electrically operate said selecting magnets; and means operatively coupling said actuating magnet to said sensing means for actuating said printing actuating magnet at times corresponding to the beginning of the first interval of a coded pulse train.

References Cited in the file of this patent

UNITED STATES PATENTS

| | | |
|---|---|---|
| 2,497,936 | Finch | Feb. 21, 1950 |
| 2,565,479 | Cruikshank | Aug. 28, 1951 |
| 2,862,054 | Curtis | Nov. 25, 1958 |